United States Patent
Shao

(10) Patent No.: US 11,452,125 B2
(45) Date of Patent: Sep. 20, 2022

(54) INFORMATION SENDING AND INFORMATION DETERMINING METHOD AND APPARATUS

(71) Applicant: Huawei Technologies Co., Ltd., Shenzhen (CN)

(72) Inventor: Jiafeng Shao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 16/712,496

(22) Filed: Dec. 12, 2019

(65) Prior Publication Data

US 2020/0120700 A1   Apr. 16, 2020

Related U.S. Application Data

(63) Continuation of application No. PCT/CN2018/088969, filed on May 30, 2018.

(30) Foreign Application Priority Data

Jun. 16, 2017   (CN) .......................... 201710459693.4

(51) Int. Cl.
*H04W 72/04*   (2009.01)
*H04W 72/12*   (2009.01)
(Continued)

(52) U.S. Cl.
CPC ....... *H04W 72/1273* (2013.01); *H04L 5/0082* (2013.01); *H04W 72/0446* (2013.01); *H04W 72/0466* (2013.01); *H04W 72/0493* (2013.01)

(58) Field of Classification Search
CPC ......... H04W 72/0446; H04W 72/0413; H04W 72/042; H04W 72/1284; H04W 72/04;
(Continued)

(56) References Cited

U.S. PATENT DOCUMENTS

2009/0316811 A1*  12/2009  Maeda ............. H04W 72/1278
                                                 375/260
2012/0122465 A1*   5/2012  Landstrom ....... H04W 72/1252
                                                 455/450
(Continued)

FOREIGN PATENT DOCUMENTS

CN         104468030 A        3/2015
CN         104620629 A        5/2015
(Continued)

OTHER PUBLICATIONS

Intel Corporation, "Scheduling request design for NR," 3GPP TSG-RAN WG1 #87, R1-1611998, Reno, NV, USA, Nov. 14-18, 2016, 4 pages.
(Continued)

*Primary Examiner* — Sai Aung
(74) *Attorney, Agent, or Firm* — Slater Matsil, LLP

(57) ABSTRACT

This application relates to the field of wireless communications, and in particular, to an information sending method and apparatus, and an information determining method and apparatus. This application provides an information sending method, including: determining, by a terminal device, a first time length corresponding to first information, where the first information is information about a data transmission resource; and sending, by the terminal device, a scheduling request on a first resource, where a time length of the first resource is equal to the first time length, and the scheduling request is used to request the data transmission resource.

17 Claims, 7 Drawing Sheets

Network device 110

Terminal device 120

(51) Int. Cl.
*H04L 5/00* (2006.01)
*H04L 1/18* (2006.01)

(58) Field of Classification Search
CPC . H04W 72/12; H04W 72/1289; H04W 72/14; H04W 74/004; H04W 72/1268; H04W 72/1278; H04W 72/1263; H04W 24/10; H04W 28/0278
See application file for complete search history.

(56) References Cited

U.S. PATENT DOCUMENTS

| | | | |
|---|---|---|---|
| 2014/0010179 A1 | 1/2014 | Lee | |
| 2015/0270932 A1* | 9/2015 | Agiwal | H04L 1/1816 370/336 |
| 2016/0021646 A1* | 1/2016 | Hu | H04W 52/28 370/329 |
| 2017/0048727 A1 | 2/2017 | Cho et al. | |
| 2017/0164363 A1 | 6/2017 | Zhang et al. | |
| 2017/0265181 A1* | 9/2017 | Patel | H04W 72/0446 |
| 2017/0290026 A1 | 10/2017 | Li et al. | |
| 2018/0020431 A1 | 1/2018 | Cho et al. | |
| 2018/0098337 A1* | 4/2018 | Lee | H04W 72/1278 |
| 2018/0249464 A1 | 8/2018 | Au et al. | |
| 2019/0074936 A1 | 3/2019 | Lee et al. | |
| 2019/0312685 A1* | 10/2019 | Zhou | H04L 1/1864 |
| 2021/0076397 A1* | 3/2021 | Xiong | H04W 76/27 |

FOREIGN PATENT DOCUMENTS

| | | |
|---|---|---|
| CN | 105916203 A | 8/2016 |
| CN | 106211331 A | 12/2016 |
| CN | 106550312 A | 3/2017 |
| CN | 106550457 A | 3/2017 |
| CN | 106793135 A | 5/2017 |
| WO | 2016048593 A1 | 3/2016 |
| WO | 201 6160330 A1 | 10/2016 |
| WO | 2017034096 A1 | 3/2017 |
| WO | 2017172447 A1 | 10/2017 |

OTHER PUBLICATIONS

Intel Corporation, "Enhancements to SR targeting low latency requirements," 3GPP TSG RAN WG1 Meeting #89, R1-1707406, Hangzhou, P. R. China, May 15-19, 2017, 5 pages.

Alcatel-Lucent et al., "Enhancement for SR procedure by connected UEs," 3GPP TSG-RAN WG2 Meeting #78, R2-122606, Prague, Czech Republic, May 21-25, 2012, 4 pages.

Huawei et al., "Discussion on SR in shortened TTI scenario," 3GPP TSG RAN WG1 Meeting #89, R1-1707033,14 May 15-19, 2017, 4 pages.

Sharp: "Structure of PUCCH in short duration", 3GPP TSG RAN WG1 Meeting #88, R1-1703240, Feb. 13-17, 2017, 4 pages, Athens Greece.

* cited by examiner

INFORMATION SENDING AND INFORMATION DETERMINING METHOD AND APPARATUS

CROSS-REFERENCE TO RELATED APPLICATIONS

This application is a continuation of International Application No. PCT/CN2018/088969, filed on May 30, 2018, which claims priority to Chinese Patent Application No. 201710459693.4, filed on Jun. 16, 2017. The disclosures of the aforementioned applications are hereby incorporated by reference in their entireties.

TECHNICAL FIELD

This application relates to the communications field, and in particular, to an information sending method and apparatus, and an information determining method and apparatus.

BACKGROUND

In a long term evolution advanced (LTE-A) system, a terminal device notifies, by sending a scheduling request (SR), a network device that the terminal device needs an uplink data transmission resource to send uplink data, and the network device allocates the uplink resource to the terminal device after receiving the scheduling request. It can be found that in an existing LTE-A system, the scheduling request can merely be used to notify the network device that the terminal device needs an uplink data transmission resource. However, the network device cannot determine, based on the scheduling request, information about the uplink data transmission resource required by the terminal device. As a result, the uplink data transmission resource scheduled by the network device may not be applicable to the terminal device for data transmission. Consequently, a relatively high latency of uplink data transmission is caused. However, in a next generation communications system, such as the 5th generation mobile communication (5G), more challenging requirements are posed on the latency in many scenarios. Therefore, the communications system needs a mechanism with a lower latency for requesting resources by a terminal device and for allocating resources by a network device.

SUMMARY

In view of this, this application provides an information sending method and apparatus, and an information determining method and apparatus, to resolve a problem that a data transmission resource allocated by a network device to a terminal device is not applicable to data transmission by the terminal device, thereby reducing a latency of data transmission.

According to a first aspect, this application provides an information sending method, including: determining, by a terminal device, a first time length corresponding to first information, where the first information includes information about a data transmission resource; and sending, by the terminal device, a scheduling request on a first resource, where a time length of the first resource is equal to the first time length, and the scheduling request is used to request the data transmission resource. The terminal device sends the scheduling request based on the first time length corresponding to the information about the data transmission resource, so that not only can notify the network device that the terminal device requests the data transmission resource, but also can notify the network device of the information about the data transmission resource requested by the terminal device. In this way, the network device can schedule, for the terminal device based on the scheduling request, a resource applicable to data transmission by the terminal device, a latency is reduced, and signaling overheads are reduced.

With reference to the first aspect, in a possible design, the terminal device determines, based on a first correspondence, the first time length corresponding to the first information. The first correspondence includes a correspondence between the first information and P time lengths. The P time lengths include the first time length, and P is an integer greater than or equal to 2. Alternatively, the terminal device determines, based on a second correspondence, the first time length corresponding to the first information. The second correspondence includes a correspondence between the first information and a first time length range, and the first time length range includes the first time length. Alternatively, the terminal device determines, based on a third correspondence, the first time length corresponding to the first information. The third correspondence includes a correspondence between Q pieces of information and the first time length. The Q pieces of information include the first information, and Q is a positive integer.

According to a second aspect, this application provides an information sending method, including: determining, by a terminal device, a scheduling request based on first information, where the scheduling request corresponds to a first time length, and the first information is information about a data transmission resource; and sending, by the terminal device, the scheduling request on a first resource, where a time length of the first resource is equal to the first time length, and the scheduling request is used to request the data transmission resource.

With reference to the second aspect, in a possible design, the scheduling request and the first time length satisfy a fourth correspondence. The fourth correspondence includes a correspondence between the scheduling request and P time lengths, and P is an integer greater than or equal to 2. The P time lengths include the first time length. Alternatively, the scheduling request and the first time length satisfy a fifth correspondence. The fifth correspondence includes a correspondence between the scheduling request and a first time length range, and the first time length range includes the first time length. Alternatively, the scheduling request and the first time length satisfy a sixth correspondence. The sixth correspondence includes a correspondence between Q scheduling requests and the first time length, and Q is a positive integer. The Q scheduling requests include the scheduling request determined by the terminal device.

With reference to the first aspect, the second aspect and the foregoing implementations thereof, in a possible design, after sending the scheduling request, the terminal device sends another scheduling request on a second resource. A frequency domain resource of the second resource is the same as a frequency domain resource of the first resource, and a code domain resource of the second resource is the same as a code domain resource of the first resource. The another scheduling request may be sent based on the first aspect, the second aspect and the foregoing implementations. In the foregoing manner, a plurality of scheduling requests of the terminal device may occupy a same frequency domain resource and a same code domain resource, and system resources can be saved, so that a system can support more terminal devices in sending scheduling requests.

With reference to the first aspect, the second aspect and the foregoing implementations thereof, in a possible design, the terminal device sends the scheduling request on the first resource based on second information, and the second information includes at least one of a first sequence, a first pattern, first power information and first scrambling code information. The terminal device may send the scheduling request on the first resource based on time domain resources occupied by the second information.

With reference to the first aspect, the second aspect and the foregoing implementations thereof, in a possible design, the time domain resources occupied by the second information include first M symbols in time domain resources of the first resource and last N symbols in the time domain resources of the first resource, and the first time length is a quantity of symbols from the M symbols to the N symbols; or the time domain resources occupied by the second information include first M symbols in time domain resources of the first resource and N symbols after the time domain resources of the first resource, the first time length is a sum of a quantity of symbols between the M symbols and the N symbols and a quantity of the M symbols, and the terminal device further sends the second information on the N symbols; or the time domain resources occupied by the second information include M symbols before time domain resources of the first resource and last N symbols in the time domain resources of the first resource, the first time length is a sum of a quantity of symbols between the M symbols and the N symbols and a quantity of the N symbols, and the terminal device further sends the second information on the M symbols; or the time domain resources occupied by the second information include M symbols before time domain resources of the first resource and N symbols after the time domain resources of the first resource, the first time length is a quantity of symbols between the M symbols and the N symbols, and the terminal device further sends the second information on the M symbols and the N symbols. M and N are both positive integers.

With reference to the first aspect, the second aspect and the foregoing implementations thereof, in a possible design, time domain resources of the first resource include time domain resources occupied by third information. The third information includes at least one of a second sequence, a second pattern, second scrambling code information and data, and the third information is different from the second information. The sending, by the terminal device, the scheduling request on the first resource based on the time domain resources occupied by the second information includes: sending, by the terminal device, the scheduling request on the first resource based on the time domain resources occupied by the second information and the time domain resources occupied by the third information.

With reference to the first aspect, the second aspect and the foregoing implementations thereof, in a possible design, the time domain resources occupied by the second information include first M symbols in the time domain resources of the first resource and last N symbols in the time domain resources of the first resource, and the first time length is a sum of a quantity of symbols occupied by the third information, a quantity of the M symbols and a quantity of the N symbols; or the time domain resources occupied by the second information include first M symbols in the time domain resources of the first resource, and the first time length is a sum of a quantity of symbols occupied by the third information and a quantity of the M symbols; or the time domain resources of the second information include last N symbols in the time domain resources of the first resource, and the first time length is a sum of a quantity of symbols occupied by the third information and a quantity of the N symbols. M and N are both positive integers.

With reference to the first aspect, the second aspect and the foregoing implementations thereof, in a possible design, the time domain resources occupied by the second information include M symbols before the time domain resources of the first resource and N symbols after the time domain resources of the first resource, the first time length a quantity of symbols occupied by the third information, and the terminal device further sends the second information on the M symbols and the N symbols; or the time domain resources occupied by the second information include M symbols before the time domain resources of the first resource, the network device determines that the first time length is a quantity of symbols occupied by the third information, and the terminal device further sends the second information on the M symbols; or the time domain resources occupied by the second information include N symbols after the time domain resources of the first resource, the first time length is a quantity of symbols occupied by the third information, and the terminal device further sends the second information on the N symbols. M and N are both positive integers.

With reference to the first aspect, the second aspect and the foregoing implementations thereof, in a possible design, the time domain resources occupied by the second information include M symbols before the time domain resources of the first resource and last N symbols in the time domain resources of the first resource, the first time length is a sum of a quantity of symbols occupied by the third information and a quantity of the N symbols, and the terminal device further sends the second information on the M symbols; or the time domain resources occupied by the second information include first M symbols in the time domain resources of the first resource and N symbols after the time domain resources of the first resource, the first time length is a sum of a quantity of symbols occupied by the third information and a quantity of the M symbols, and the terminal device further sends the second information on the N symbols. M and N are both positive integers.

With reference to the first aspect, the second aspect and the foregoing implementations thereof, in a possible design, the terminal device sends the second information based on a first power threshold, and/or the terminal device sends the third information based on a second power threshold.

With reference to the first aspect, the second aspect and the foregoing implementations thereof, in a possible design, the sending, by the terminal device, a scheduling request on a first resource further includes: sending, by the terminal device, the second information on a resource other than the first resource, where the second information is used to indicate the first time length. The terminal device sends at least one physical uplink channel on a third resource, and the physical uplink channel carries the scheduling request. The third resource includes the first resource and a resource occupied by the second information.

In a possible design, a composition mode of the third resource is one of the following: a composition mode 1 of the third resource, including: one or more time domain resources occupied by the second information are included before the time domain resources of the first resource, and one or more time domain resources occupied by the second information are included after the time domain resources of the first resource; a composition mode 2 of the third resource, including: one or more time domain resources occupied by the second information are included after the time domain resources of the first resource; and a composition mode 3 of the third resource, including: one or more time domain resources occupied by the second information are included before the time domain resources of the first resource.

According to a third aspect, this application provides an information determining method, including: determining, by a network device, a first time length of a first resource, where the first resource is used to carry a scheduling request, and the scheduling request is used to request a data transmission resource; and determining, by the network device, first information corresponding to the first time length, where the first information includes information about the data transmission resource.

With reference to the third aspect, in a possible design, the network device determines, based on a first correspondence, the first information corresponding to the first time length. The first correspondence includes a correspondence between P time lengths and the first information. The P time lengths include the first time length, and P is an integer greater than or equal to 2. Alternatively, the network device determines, based on a second correspondence, the first information corresponding to the first time length. The second correspondence includes a correspondence between a first time length range and the first information, and the first time length range includes the first time length. Alternatively, the network device determines, based on a third correspondence, the first information corresponding to the first time length. The third correspondence includes a correspondence between the first time length and Q pieces of information. The Q pieces of information include the first information, and Q is a positive integer.

According to a fourth aspect, this application provides an information determining method, including: determining, by a network device, a scheduling request corresponding to a first time length, where a time length of a first resource on which the scheduling request is located is the first time length, and the scheduling request is used to request a data transmission resource; and determining, by the network device, first information corresponding to the scheduling request, where the first information includes information about the data transmission resource.

With reference to the fourth aspect, in a possible design, the determining, by a network device, a scheduling request corresponding to a first time length of a first resource includes: determining, by the network device based on a fourth correspondence, the scheduling request corresponding to the first time length. The fourth correspondence includes a correspondence between P time lengths and the scheduling request. The P time lengths include the first time length, and P is an integer greater than or equal to 2. Alternatively, the network device determines, based on a fifth correspondence, the scheduling request corresponding to the first time length. The fifth correspondence includes a correspondence between a first time length range and the scheduling request, and the first time length range includes the first time length. Alternatively, the network device determines, based on a sixth correspondence, the scheduling request corresponding to the first time length. The sixth correspondence includes a correspondence between the first time length and Q scheduling requests. The Q scheduling requests include the scheduling request determined by the network device, and Q is a positive integer.

With reference to the third aspect, the fourth aspect and the foregoing implementations thereof, in a possible design, the network device determines the first time length based on second information, and the second information includes at least one of a first sequence, a first pattern, first power information and first scrambling code information. The network device may determine the first time length based on time domain resources occupied by the second information.

With reference to the third aspect, the fourth aspect and the foregoing implementations thereof, in a possible design, the time domain resources occupied by the second information include first M symbols in time domain resources of the first resource and last N symbols in the time domain resources of the first resource, and the network device determines that the first time length is a quantity of symbols from the M symbols to the N symbols; or the time domain resources occupied by the second information include first M symbols in time domain resources of the first resource and N symbols after the time domain resources of the first resource, and the network device determines that the first time length is a sum of a quantity of symbols between the M symbols and the N symbols and a quantity of the M symbols; or the time domain resources occupied by the second information include M symbols before time domain resources of the first resource and last N symbols in the time domain resources of the first resource, and the network device determines that the first time length is a sum of a quantity of symbols between the M symbols and the N symbols and a quantity of the N symbols; or the time domain resources occupied by the second information include M symbols before time domain resources of the first resource and N symbols after the time domain resources of the first resource, and the network device determines that the first time length is a quantity of symbols between the M symbols and the N symbols. M and N are both positive integers.

With reference to the third aspect, the fourth aspect and the foregoing implementations thereof, in a possible design, time domain resources of the first resource include time domain resources occupied by third information. The third information includes at least one of a second sequence, a second pattern, second scrambling code information and data, and the third information is different from the second information. The determining, by the network device, the first time length based on time domain resources occupied by the second information includes: determining, by the network device, the first time length based on the time domain resources occupied by the second information and the time domain resources occupied by the third information.

With reference to the third aspect, the fourth aspect and the foregoing implementations thereof, in a possible design, the time domain resources occupied by the second information include first M symbols in the time domain resources of the first resource and last N symbols in the time domain resources of the first resource, and the network device determines that the first time length is a sum of a quantity of symbols occupied by the third information, a quantity of the M symbols and a quantity of the N symbols; or the time domain resources occupied by the second information include first M symbols in the time domain resources of the first resource, and the network device determines that the first time length is a sum of a quantity of symbols occupied by the third information and a quantity of the M symbols; or the time domain resources of the second information include last N symbols in the time domain resources of the first resource, and the network device determines that the first time length is a sum of a quantity of symbols occupied by the third information and a quantity of the N symbols. M and N are both positive integers.

With reference to the third aspect, the fourth aspect and the foregoing implementations thereof, in a possible design, the time domain resources occupied by the second information include M symbols before the time domain resources of the first resource and N symbols after the time domain resources of the first resource, and the network device determines that the first time length is a quantity of symbols occupied by the third information; or the time domain resources occupied by the second information include M symbols before the time domain resources of the first resource, and the network device determines that the first time length is a quantity of symbols occupied by the third information; or the time domain resources occupied by the second information include N symbols after the time domain resources of the first resource, and the network device determines that the first time length is a quantity of symbols occupied by the third information. M and N are both positive integers.

With reference to the third aspect, the fourth aspect and the foregoing implementations thereof, in a possible design, the time domain resources occupied by the second information include M symbols before the time domain resources of the first resource and last N symbols in the time domain resources of the first resource, and the network device determines that the first time length is a sum of a quantity of symbols occupied by the third information and a quantity of the N symbols; or the time domain resources occupied by the second information include first M symbols in the time domain resources of the first resource and N symbols after the time domain resources of the first resource, and the network device determines that the first time length is a sum of a quantity of symbols occupied by the third information and a quantity of the M symbols. M and N are both positive integers.

With reference to the third aspect, the fourth aspect and the foregoing implementations thereof, in a possible design, the network device determines, based on a third power threshold, the time domain resources occupied by the second information, and/or the network device determines, based on a fourth power threshold, the time domain resources occupied by the third information.

According to a fifth aspect, this application provides a terminal device, and the terminal device includes functions of terminal device behaviors in the methods in the foregoing first aspect and second aspect. The functions may be implemented by hardware, and may also be implemented by hardware executing corresponding software. The hardware or software includes one or more modules corresponding to the foregoing functions.

According to a sixth aspect, this application provides a network device, and the network device includes functions of network device behaviors in the methods in the foregoing third aspect and fourth aspect. The functions may be implemented by hardware, and may also be implemented by hardware executing corresponding software. The hardware or software includes one or more modules corresponding to the foregoing functions.

According to a seventh aspect, this application provides a terminal device, and the terminal device includes a processor and a transmitter. The processor is configured to support the terminal device in executing the corresponding functions in the foregoing methods, for example, determining the first time length in the foregoing methods. The transmitter is configured to support the terminal device in sending the information in the foregoing methods, for example, sending the scheduling request on the first resource. In a possible design, a structure of the terminal device may further include a memory, and the memory is configured to: be coupled to the processor and save necessary program instructions and data of the terminal device.

According to an eighth aspect, this application provides a network device, and the network device includes a processor. The processor is configured to support the network device in executing the corresponding functions in the foregoing methods, such as determining the first time length in the foregoing methods. In a possible design, the network device may further include a transmitter, and the transmitter is configured to support the network device in receiving the information in the foregoing methods, for example, receiving the scheduling request on the first resource. In a possible design, a structure of the network device may further include a memory, and the memory is configured to: be coupled to the processor and save necessary program instructions and data of the terminal device.

According to a ninth aspect, this application provides a communications system, and the system includes the terminal device and the network device described in the foregoing aspects. The terminal device and the network device communicate with each other to execute the information sending method and the information determining method described in the foregoing aspects.

According to a tenth aspect, this application provides a computer storage medium, configured to store a computer software instruction used by the foregoing terminal device. The computer software instruction includes a program designed to execute the foregoing aspects.

According to an eleventh aspect, this application provides a computer storage medium, configured to store computer software instructions used by the foregoing network device. The computer storage medium contains a program designed to execute the foregoing aspects.

According to a twelfth aspect, this application provides a chip system, and the chip system includes a processor, configured to support a terminal device in implementing the functions in the foregoing aspects, for example, determining the first time length in the foregoing methods. In a possible design, the chip system further includes a memory, and the memory is configured to save necessary program instructions and data of a data sending device. The chip system may include a chip, and may also include a chip and another discrete device.

According to a thirteenth aspect, this application provides a chip system, and the chip system includes a processor, configured to support a network device in implementing the functions in the foregoing aspects, for example, determining the first time length in the foregoing methods. In a possible design, the chip system further includes a memory, and the memory is configured to save necessary program instructions and data of a data receiving device. The chip system may include a chip, and may also include a chip and another discrete device.

BRIEF DESCRIPTION OF THE DRAWINGS

Embodiments of this application are described below with reference to the accompanying drawings.

DETAILED DESCRIPTION OF ILLUSTRATIVE EMBODIMENTS

The following describes technical solutions of this application with reference to accompanying drawings.

The network architecture and the service scenario described in the embodiments of this application are intended to describe the technical solutions in the embodiments of this application more clearly, and do not constitute a limitation on the technical solutions provided in the embodiments of this application. Persons of ordinary skill in the art may know that: With the evolution of the network architecture and the emergence of new service scenarios, the technical solutions provided in the embodiments of this application are also applicable to similar technical problems.

Figure 1:
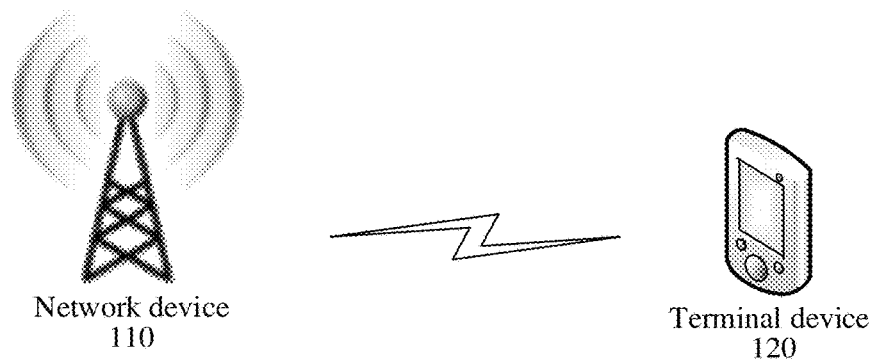
FIG. 1 is a schematic diagram of a possible application scenario according to this application.

A technology described in this application may be applicable to a long term evolution (LTE) system and a subsequent evolved system such as the 5th generation mobile communication (5G). FIG. 1 is a schematic diagram of a possible application scenario according to this application. A communications system 100 in FIG. 1 includes a network device 110 and a terminal device 120, and the network device 110 and the terminal device 120 communicate with each other by using a wireless network. For example, when the terminal device 120 requests an uplink data transmission resource to transmit uplink data, a wireless communications module of the terminal device 120 may send a scheduling request to the network device 110. After receiving the scheduling request, the network device 110 can learn that the terminal device 120 requests that the uplink data transmission resource is allocated to the terminal device 120 for uplink data transmission, so that the network device 110 may determine whether to allocate the uplink data transmission resource to the terminal device 120.

The terminal device in this application may also be referred to as an access terminal, user equipment (UE), a subscriber unit, a subscriber station, a mobile station, a mobile console, a remote station, a remote terminal, a mobile device, a user terminal, a terminal, a wireless communications device, a user agent or a user apparatus. The access terminal may be a cellular phone, a hand-held device with a wireless communication function, a computing device or another device connected to a wireless modem, an in-vehicle device, a wearable device and user equipment in the 5G communications system.

The network device may be a base transceiver station (base transceiver station, BTS) in a code division multiple access (CDMA) system, a NodeB (NB) in a wideband code division multiple access (WCDMA) system, an evolved NodeB (eNB) in a long term evolution (LTE) system, or a gNB in a 5G communications system. The foregoing base stations are merely described as examples. The network device may further be a relay station, an access point, an in-vehicle device, a wearable device and a device of another type.

The foregoing communications systems applicable to this application are merely described as examples, and communications systems applicable to this application are not limited thereto. For example, quantities of network devices and terminal devices included in the communications system may alternatively be other quantities.

For ease of understanding of this application, before the information sending method and the information determining method provided by this application are described, a brief description is first made to concepts in this application. Persons skilled in the art can be clear that the concepts in this application may be applied to a large quantity of telecommunications systems, network architectures and communication standards. It should be noted that, descriptions that are of the embodiments of this application and that use some English abbreviations, such as the LTE system, as examples in this application may change as the networks evolve. For a specific evolution, refer to descriptions in corresponding standards.

The LTE system is used as an example. A time domain of the LTE system is identified by using a wireless frame, and one wireless frame includes 10 subframes. A length of each subframe is 1 millisecond, each subframe includes two timeslots, and each timeslot is 0.5 milliseconds.

A quantity of symbols included in each timeslot is related to a length of a cyclic prefix (CP) in the subframe. If the CP is a normal CP, each timeslot includes 7 symbols, and each subframe includes 14 symbols. For example, each subframe includes symbols with respective sequence numbers of #0, #1, #2, #3, #4, #5, #6, #7, #8, #9, #10, #11, #12, and #13. If the CP is a long CP, each timeslot includes 6 symbols, and each subframe includes 12 symbols. For example, each subframe includes symbols with respective sequence numbers of #0, #1, #2, #3, #4, #5, #6, #7, #8, #9, #10, and #11.

The 5G system is used as an example. In the 5G system, various service types exist and correspond to different service requirements. For example, ultra reliable and low latency scenario (uRLLC) requires low latency and high reliability, enhanced mobile broadband (eMBB) requires high spectral efficiency and has no requirement on latency, and massive machine type communication (mMTC) requires periodic transmission with low power. Therefore, to meet requirements for different scenarios, a length of a subframe in the 5G system may not be 1 millisecond. In the 5G system, each subframe includes a plurality of OFDM symbols or SC-FDMA symbols, but a length of the subframe depends on different subcarrier spacings. If a subcarrier spacing is 15 kHz, then the length of the subframe is 1 millisecond; and if the subcarrier spacing is greater than 15 kHz, then the length of the subframe may be less than 1 millisecond. The 5G system may include transmission of a plurality of subcarrier spacings. Therefore, in the NR system, time lengths of subframes corresponding to different subcarrier spacings are different, and spacings of symbols corresponding to different subcarrier spacings may also be different.

It is worth mentioning that, in the embodiments of this application, an uplink symbol and a downlink symbol are both briefly referred to as a symbol. The symbol may be a single carrier-frequency division multiple access (SC-FDMA) symbol, a cyclic prefix orthogonal frequency division multiple access (CP-OFDM) symbol, or another OFDM symbol. This application does not limit an uplink multiple access mode and a downlink multiple access mode.

In addition, all types of physical channels of the existing LTE system are designed based on a transmission time interval (TTI) length of 1 millisecond, but the TTI length may be less than 1 millisecond with the evolution of the system. The TTI in this application should be understood as a transmission time in which one or more information units that can be decoded independently are located.

Figure 2:
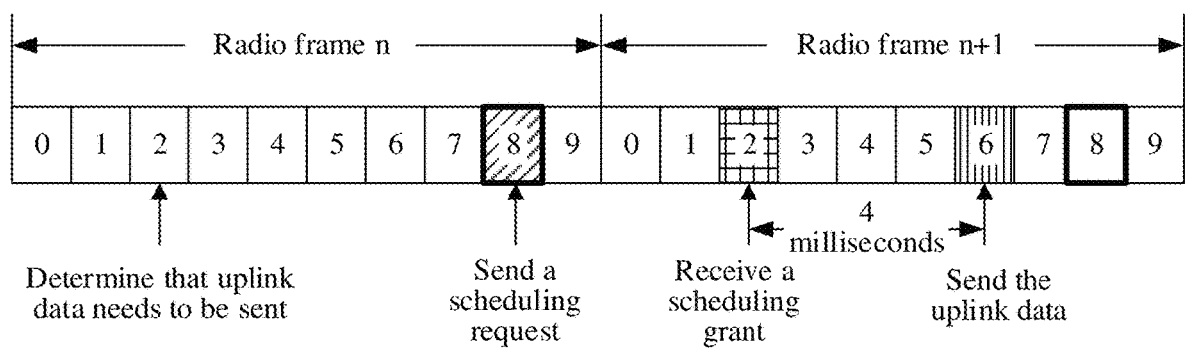
FIG. 2 is a schematic diagram of a process in which a terminal device sends uplink data according to this application.

FIG. 2 shows a typical process in which a terminal device sends uplink data in an LTE system. The terminal device first needs to send a scheduling request on a periodic uplink control channel resource allocated by a network device. For example, each wireless frame includes a subframe 0 to a subframe 9, that is, 10 subframes in total. The periodic uplink control channel resource that is allocated to the terminal device by the network device and that can be used by the scheduling request is the subframe 8 of each wireless frame. When the terminal device determines, on a subframe 2 of a wireless frame n, that uplink data needs to be sent, because the subframe 2 to a subframe 7 are not resources that can be used by the scheduling request, the terminal device needs to wait for a subframe 8 of the wireless frame n before sending the scheduling request. When determining, after receiving the scheduling request, to allocate an uplink data transmission resource to the terminal device, the network device generates and sends a scheduling grant. After receiving the scheduling grant on a subframe 2 of a wireless frame n+1, the terminal device sends the uplink data on a subframe 6 of the wireless frame n+1 based on the scheduling grant, and if data of the terminal device is not sent completely, the terminal device needs to wait for a next scheduling grant. In the foregoing process, the scheduling request sent by the terminal device can only be used to notify the network device that the terminal device needs the uplink data transmission resource. However, the network device cannot determine, based on the scheduling request, information about the uplink data transmission resource required by the terminal device. As a result, the uplink data transmission resource scheduled by the network device may not be applicable to the terminal device for data transmission, leading to a relatively high latency of uplink data transmission. In addition, the network device detects, only on the uplink control channel resource that can be used by the scheduling request and that is allocated to the terminal device by the network device, the scheduling request of the terminal device. Referring to the previous example in which the uplink control channel resource that is allocated to the terminal device by the network device and that can be used by the scheduling request is the subframe 8 of each wireless frame, then the network device detects, only on each subframe 8, the scheduling request sent by the terminal device. If the network device detects information on another subframe other than the subframe 8, for example, the network device detects information on a subframe 9 of the wireless frame n, then the network device does not determine the information detected on the subframe 9 as the scheduling request sent by the terminal device. Therefore, in the foregoing process of signaling interaction, the terminal device needs to wait for the periodic uplink control channel resource allocated by the network device before sending the scheduling request, and the network device detects the scheduling request only on the allocated periodic resource, also leading to an extra latency. It can be learned from the foregoing analysis that the data transmission requirements, such as high reliability and low latency in the uRLLC scenario in the 5G system, are apparently unachievable based on the foregoing interaction process. Therefore, for the next generation network, a new method is required to support requirements of various scenarios.

The technical solutions provided in the embodiments of this application are described below more detail with reference to the accompanying drawings.

Figure 3:
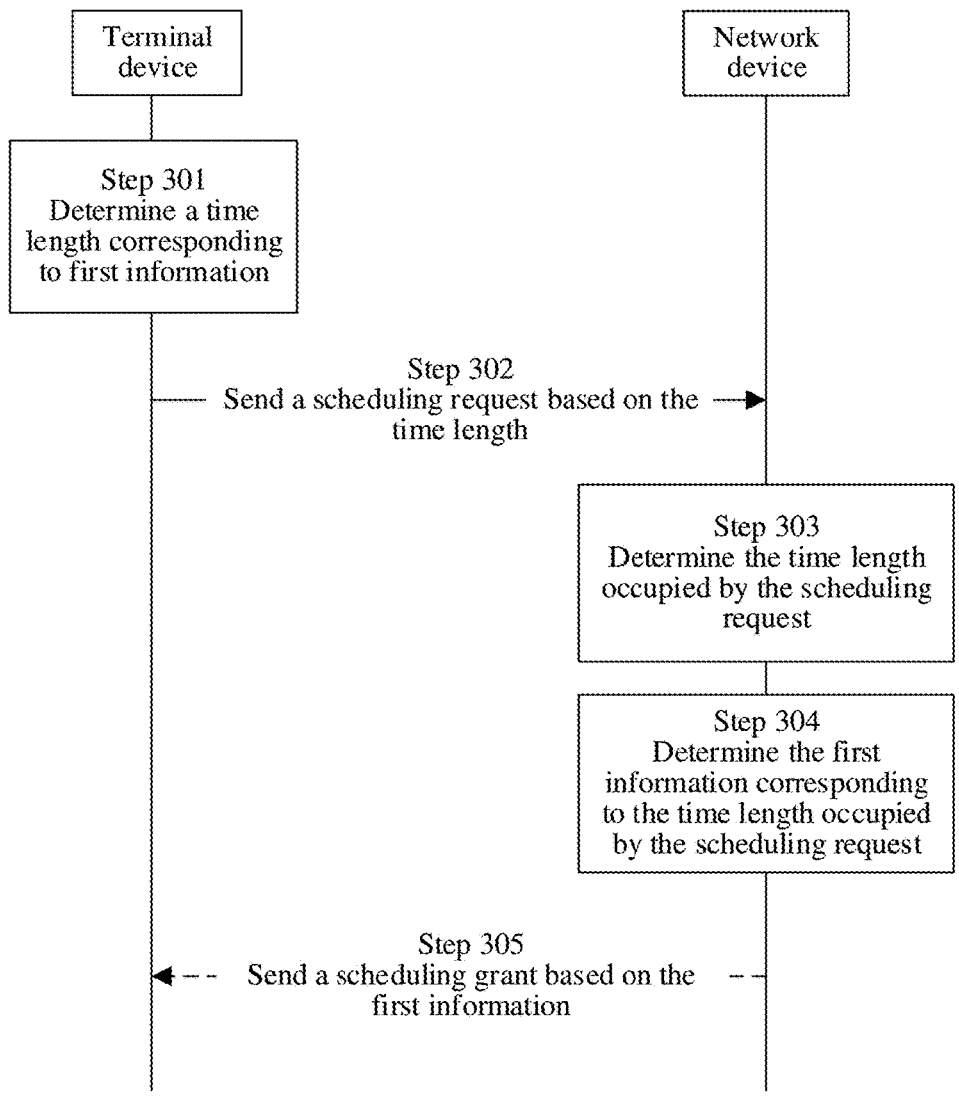
FIG. 3 is a schematic diagram of interaction between an information sending method and an information determining method according to this application.

FIG. 3 is a schematic flowchart of an information sending method and an information determining method according to this application. In FIG. 3, a terminal device and a network device communicate with each other to implement an information sending method and an information determining method provided in this application.

When needing to request a data transmission resource for data transmission, the terminal device executes the information sending method. In step 301, the terminal device determines a first time length corresponding to first information, and the first information includes information about the data transmission resource. The first information may include at least one of a TTI length, a subcarrier spacing and a priority of the data transmission resource. For example, the first information is a TTI length of 0.5 milliseconds, indicating that the terminal device expects to request a data transmission resource with a TTI length of 0.5 milliseconds. If a time length corresponding to the TTI length of 0.5 milliseconds is 3 symbols, then the terminal device determines that the first time length is 3 symbols. For example, the first information is a subcarrier spacing of 60 kHz, indicating that the terminal device expects to request a data transmission resource with a subcarrier spacing of 60 kHz. If the subcarrier spacing of 60 kHz corresponds to a time length of 7 symbols, then the terminal device determines that the first time length is 7 symbols. For example, the first information is a high priority, indicating that the terminal device expects to request a data transmission resource with a high priority. If a time length corresponding to the high priority is 14 symbols, then the terminal device determines that the first time length is 14 symbols. The data transmission resource may include at least one of a logical channel resource, a physical channel resource and a transmission channel resource. The first information includes at least one of information about the logical channel resource, information about the physical channel resource and information about the transmission channel resource. For example, the data transmission resource is a logical channel resource. When the first information is a subcarrier spacing of 60 kHz, it indicates that the terminal device expects to request a logical channel with a subcarrier spacing of 60 kHz. If the subcarrier spacing of 60 kHz corresponds to a time length of 7 symbols, the terminal device determines that the first time length is 7 symbols. For example, the data transmission resource is a physical channel resource. When the first information includes a TI length of 1 millisecond and a low priority, it indicates that the terminal device expects to request a physical channel resource with a TTI length of 1 millisecond and a low priority. If the first information (the TTI length of 1 millisecond and the low priority) corresponds to 14 symbols, then the terminal device determines that the first time length is 14 symbols. It should be noted that a unit of the time length in the embodiments of this application may include any time length unit such as a symbol, a microsecond, a millisecond, a second, a timeslot or a subframe. For example, the first time length may be 1 ms, or 2 ms, or 3 ms, or 0.125 ms, or 0.5 ms, or 0.375 ms, or 0.25 ms, or 0.0625 ms, or 1 symbol, or 2 symbols, or 3 symbols, or 4 symbols, or 5 symbols, or 6 symbols, or 7 symbols, or 14 symbols, or 21 symbols or the like. In addition, as persons skilled in the art understand, the logical channel, physical channel and transmission channel in this application have a common technical meaning, and are applicable to definitions in related communication standards. For example, the logical channel is a channel used by a medium access control (MAC) layer to provide a data transmission service. The transmission channel is a channel defined based on different transport formats, and the transmission channel is used to access the data transmission service. The transmission channel is an interface channel between the MAC layer and a physical layer, and the physical layer performs required operations, such as channel coding interleaving, by using the transmission channel. It should be noted that there is a mapping relationship between the transmission channel and the logical channel. After the data transmission service is generated, the data transmission service is mapped to the logical channel first, and then mapped to the transmission channel from the logical channel, and then mapped to the physical channel from the transmission channel for data transmission. The physical channel is a channel of the physical layer, and is a channel used to transmit data and/or control information on an air interface. The physical channel may be a physical uplink shared channel (PUSCH), or a physical downlink shared channel (PDSCH).

In an embodiment, the first information includes at least one of the following: a maximum TTI length of the data transmission resource, a minimum TTI length of the data transmission resource, a maximum subcarrier spacing of the data transmission resource, a minimum subcarrier spacing of the data transmission resource, a highest priority of the data transmission resource and a lowest priority of the data transmission resource. For example, the first information includes the maximum TTI length of the data transmission resource and the minimum TTI length of the data transmission resource, indicating that the terminal device expects to request a data transmission with a TTI length between the minimum TTI length and the maximum TTI length.

In addition, the first time length corresponding to the first information may be predefined, or notified by the network device by using higher layer signaling. For example, based on predefinition or configuration of the higher layer signaling, the foregoing subcarrier spacing of 15 kHz may correspond to a time length of 14 symbols, and may also correspond to a time length of other symbols. The higher layer signaling is signaling of an upper-layer protocol layer, and the upper-layer protocol layer is at least one of all protocol layers higher than the physical layer. The upper-layer protocol layer may be specifically at least one of the following protocol layers: a MAC layer, a radio link control (RLC) layer, a packet data convergence protocol (PDCP) layer, a radio resource control (RRC) layer, a non-access stratum (NAS) layer and the like.

An example in which the terminal device requests the uplink data transmission resource to send uplink data is used. In an example, the terminal device determines the first information based on a priority or a latency requirement of a to-be-sent uplink data transmission service. For example, for urgent uplink data or uplink data with a high priority, the terminal device requests a data transmission uplink resource with a relatively short TTI length (0.5 milliseconds), and the first information is the TTI length of 0.5 milliseconds; and for uplink data that is not urgent or uplink data with a low priority, the terminal device requests an uplink data transmission resource with a relatively long TTI length (1 millisecond), and the first information is the TTI length of 1 millisecond. In another example, the terminal device determines the first information based on signaling. For example, based on a higher layer signaling indication that a TTI length corresponding to the uplink data transmission resource requested by the terminal device is 1 millisecond, then the terminal device determines that the first information is the TTI length of 1 millisecond. It is worth mentioning that the embodiments of this application do not limit how the terminal device determines the first information, and the terminal device merely needs to determine the first time length corresponding to the first information.

In an embodiment, the terminal device determines, based on a first correspondence, the first time length corresponding to the first information. The first correspondence includes a correspondence between the first information and P time lengths. The P time lengths include the first time length, and P is an integer greater than or equal to 2. Refer to Table 1:

TABLE 1

| First information | Time length |
|---|---|
| First information 0 | Time length 0 |
|  | Time length 1 |
|  | Time length 2 |
| First information 1 | Time length 3 |
|  | Time length 4 |

Table 1 includes two groups of correspondence between the first information and the time length. The first group of correspondence includes a correspondence between the first information 0 and three time lengths (the time length 0, the time length 1 and the time length 2), and the second group of correspondence includes a correspondence between the first information 1 and two time lengths (the time length 3 and the time length 4). The first correspondence includes the first group of correspondence and/or the second group of correspondence, and the terminal device may determine, based on the first group of correspondence or the second group of correspondence in Table 1, the first time length corresponding to the first information. For example, the first information 0 in the first group of correspondence is a TTI length of 0.5 milliseconds, and the time length 0, the time length 1 and the time length 2 that correspond to the first information 0 are respectively 3 symbols, 4 symbols and 2 symbols; and the first information 1 in the second group of correspondence is a TTI length of 1 millisecond, and the time length 3 and the first time length 4 that correspond to the first information 1 are respectively 7 symbols and 14 symbols. When the terminal device determines that the first information is a TTI length of 1 millisecond, because the first information 1 included in the second group of correspondence is a TTI length of 1 millisecond, the terminal device uses, as the first time length, the time length 3 or time length 4 that corresponds to the first information 1. For example, the terminal device determines, based on at least one of a distance between the terminal device and the network device, a reference signal strength, a path loss value and a moving speed of the terminal device, that the first time length is the time length 3, that is, 7 symbols. In this embodiment of this application, the first correspondence may be preset, or may be notified by higher layer signaling. For example, the terminal device may save Table 1, or save the first group of correspondence and/or the second group of correspondence in Table 1.

In an embodiment, the terminal device determines, based on a second correspondence, the first time length corresponding to the first information. The second correspondence includes a correspondence between the first information and a first time length range, and the first time length range includes the first time length. Refer to Table 2:

TABLE 2

| First information | Time length range |
|---|---|
| First information 0 | Time length range 0 |
| First information 1 | Time length range 1 |

Table 2 includes two groups of correspondence between the first information and the time length range. The first group of correspondence includes a correspondence between the first information 0 and the time length range 0, and the second group of correspondence includes a correspondence between the first information 1 and the time length range 1. The second correspondence includes the first group of correspondence and/or the second group of correspondence, and the terminal device may determine, based on the first group of correspondence or the second group of correspondence in Table 2, the first time length corresponding to the first information. For example, the first information 0 in the first group of correspondence is a TTI length of 0.5 milliseconds, and the time length range 0 corresponding to the first information 0 is greater than or equal to 0.125 milliseconds and less than 0.5 milliseconds; and the first information 1 in the second group of correspondence is a TTI length of 1 millisecond, and the time length range 1 corresponding to the first information 1 is greater than or equal to 1 millisecond. When the terminal device determines that the first information is a TTI length of 1 millisecond, because the first information 1 included in the second group of correspondence is a TTI length of 1 millisecond, the terminal device determines, as the first time length, the time length belonging to the time length range 1. For example, the terminal device determines, based on at least one of a distance between the terminal device and the network device, a reference signal strength, a path loss value and a moving speed of the terminal device, that the first time length is 1 millisecond (greater than or equal to 1 millisecond). In this embodiment of this application, the second correspondence may be preset, or may be notified by higher layer signaling. For example, the terminal device may save Table 2, or save the first group of correspondence and/or the second group of correspondence in Table 2. It should be noted that the time length range may be greater than or equal to A and less than B, or greater than A and less than B, or greater than A and less than or equal to B, or greater than or equal to A and less than or equal to B, or less than or equal to B, or greater than or equal to A. A and B are numbers greater than or equal to 0, and units of A and B are time length units.

In an embodiment, the terminal device determines, based on a third correspondence, the first time length corresponding to the first information. The third correspondence includes a correspondence between Q pieces of information and one time length. The Q pieces of information include the first information, and Q is a positive integer. Refer to Table 3:

TABLE 3

| First information | Time length |
|---|---|
| First information 0 | Time length 0 |
| First information 1 | |
| First information 2 | Time length 1 |

Table 3 includes two groups of correspondence between the first information and the time length. The first group of correspondence includes a correspondence between two pieces of the first information (the first information 0 and the first information 1) and the time length 0, and the second group of correspondence includes a correspondence between the first information 2 and the time length 1. The third correspondence includes the first group of correspondence and/or the second group of correspondence, and the terminal device may determine, based on the first group of correspondence or the second group of correspondence in Table 3, the first time length corresponding to the first information. For example, the first information 0 in the first group of correspondence is a TTI length of 3 symbols, the first information 1 is a TTI length of 0.5 milliseconds, and the time length 0 corresponding to the first information 0 and the first information 1 is 3 symbols; and the first information 2 in the second group of correspondence is a TTI length of 1 millisecond, and the time length 1 corresponding to the first information 2 is 7 symbols. When the terminal device determines that the first information is a TTI length of 1 millisecond, because the first information 2 included in the second group of correspondence is a TTI length of 1 millisecond, the terminal device determines, as the first time length, the time length 1, that is, 7 symbols, corresponding to the first information 2. In this embodiment of this application, the third correspondence may be preset, or may be notified by higher layer signaling. For example, the terminal device may save Table 3, or save the first group of correspondence and/or the second group of correspondence in Table 3.

It is worth mentioning that the first time length corresponding to the first information may be determined in a plurality of manners in this embodiment of this application. The terminal device may determine, based on the foregoing first correspondence, the second correspondence, or the third correspondence, the first time length corresponding to the first information, and details are not described herein again. In addition, the terminal device may further determine, in another manner, the first time length corresponding to the first information. For example, the first time length corresponding to the first information may be calculated by substituting a value in the first information into a preset formula.

Returning to FIG. 3, after step 301 in which the terminal device determines the first time length corresponding to the first information, the terminal device performs step 302. The terminal device sends a scheduling request on a first resource, where a time length of the first resource is equal to the first time length, and the scheduling request is used to request the data transmission resource. Based on the foregoing example, if the first time length is 3 symbols, then a time length of the first resource occupied by the scheduling request sent by the terminal device is also 3 symbols; and if the shown first time length is 7 symbols, then the time length of the first resource occupied by the scheduling request sent by the terminal device is also 7 symbols. A process of an information sending method and an information determining method provided in this embodiment of this application is described below with reference to FIG. 4.

Figure 4:
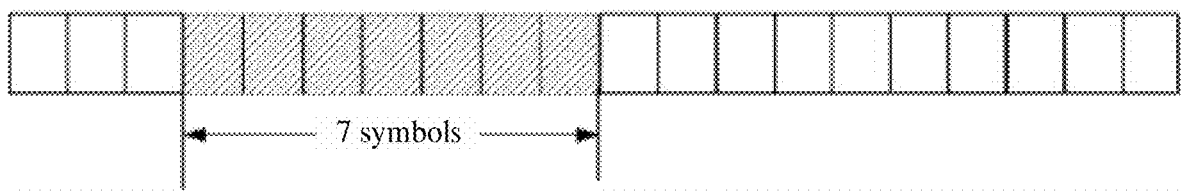
FIG. 4 is a schematic diagram of time domain resource occupation during implementation of an information sending method and an information determining method according to this application.

FIG. 4 is a schematic diagram of time domain resource occupation during implementation of an information sending method and an information determining method according to this application. In FIG. 4, time domain resources that can be used by the terminal device to send the scheduling request are schematically indicated by using horizontally continuous cells. Each cell represents a time unit, and the network device detects, on the time domain resources that are used by the terminal device to send the scheduling request and that are shown in FIG. 4, the scheduling request sent by the terminal device. It can be learned from FIG. 4 that the time domain resources that can be used by the terminal device to send the scheduling request in this embodiment of this application are continuous time units in a time period, and the network device detects the scheduling request on the continuous time units. However, in the prior art, a time domain resource used to send the scheduling request is a periodic subframe, and the network device detects the scheduling request only on the periodic subframe. It should be noted that a frequency domain and/or a code domain resource that are/is used by the terminal device and/or the network device to send and/or receive the scheduling request and that correspond(s) to the time domain resource are/is not shown in FIG. 4. However, persons skilled in the art can be clear that the resource used to send and/or receive the scheduling request also includes the frequency domain and/or the code domain resource. In addition, based on the prior art, the terminal device may send the scheduling request and the network device may detect the scheduling request on one or more symbols of the time domain resources shown in FIG. 4. For example, the terminal device sends a sequence on the one or more symbols, and the network device detects the sequence on the resource shown in FIG. 4; and/or a power at which the terminal device sends information on the one or more symbols exceeds a preset threshold, and the network device determines, as symbols occupied by the scheduling request, the one or more symbols on which the power exceeds the preset threshold and that are detected on the resource shown in FIG. 4. Certainly, another manner may also be used, and this is not limited in this embodiment of this application. In addition, an example in which each cell represents a symbol is used for description in this embodiment of this application. Apparently, each cell may also represent any time unit such as a plurality of symbols, 0.5 milliseconds, 1 timeslot, a plurality of timeslots, 1 millisecond, 1 subframe, or a plurality of subframes. However, as the system evolves, each cell may also represent a transmission time occupied by one or more information units that can be decoded independently.

The terminal device performs step 302, and starts to send the scheduling request on any symbol on the time domain resources shown in FIG. 4. It should be noted that, as shown in FIG. 4, the time domain resources used to send the scheduling request in this embodiment of this application are continuous time units in a time period. When needing to send the scheduling request, the terminal device does not need to wait, as in the prior art, for the periodic TTI of a resource used to send the scheduling request; instead, the terminal device may send the scheduling request at any time. For example, the terminal device determines, on the first symbol of the time domain resources shown in FIG. 4, that the data transmission resource needs to be requested, and the terminal device may immediately send the scheduling request, to reduce a latency of data transmission by the terminal device. Referring to FIG. 4, an example in which the first information is a subcarrier spacing of 60 kHz and the terminal device determines that the first time length corresponding to the subcarrier spacing of 60 kHz is 7 symbols is used. The terminal device sends the scheduling request on the shaded area of the time domain resources shown in FIG. 4. The shaded area shown in FIG. 4 includes 7 symbols in total. That is, the time length of the first resource carrying the scheduling request is 7 symbols, the same as the first time length, so that the terminal device requests, by sending the scheduling request with a time length of 7 symbols, a data transmission resource with a subcarrier spacing of 60 kHz from the network to transmit data. In this process, the terminal device sends the scheduling request based on the first time length corresponding to the first information instead of actually sending the first information, to report information about the requested data transmission resource to the network device.

In step 303, the network device determines the first time length of the first resource, and the first resource is used to carry the scheduling request. Also referring to FIG. 4, symbols that are occupied by the scheduling request sent by the terminal device and that are detected by the network device are 7 symbols in the shaded area in FIG. 4. That is, the network device determines that the time length of the first resource carrying the scheduling request is 7 symbols.

In step 304, the network device determines the first information corresponding to the first time length. The first information is the information about the data transmission resource requested by the terminal device. The first information may include at least one of a TTI length, a subcarrier spacing and a priority of the data transmission resource. For example, the first information that corresponds to the first time length of 7 symbols of the scheduling request and that is determined by the network device is a subcarrier spacing of 60 kHz. That is, the network device determines that the terminal device requests a data transmission resource with a subcarrier spacing of 60 kHz. The data transmission resource may include at least one of a logical channel resource, a physical channel resource and a transmission channel resource, so that the first information includes at least one of information about the logical channel resource, information about the physical channel resource and information about the transmission channel resource. For example, the data transmission resource is a transmission channel resource, and the first information that corresponds to the first time length of 7 symbols of the scheduling request and that is determined by the network device is a TTI length of 0.5 milliseconds, then the network device determines that the terminal device requests a data transmission resource with a TTI length of 0.5 milliseconds.

In an embodiment, the network device determines, based on the first correspondence, the first information corresponding to the time length of the first resource. The first correspondence includes a correspondence between P time lengths and the first information. The P time lengths include the time length of the first resource, and P is an integer greater than or equal to 2. Also referring to Table 1, Table 1 includes two groups of correspondence between the time lengths and the first information. The first group of correspondence includes the correspondence between three time lengths (the time length 0, the time length 1 and the time length 2) and the first information 0, and the second group of correspondence includes the correspondence between two time lengths (the time length 3 and the time length 4) and the first information 1. The first correspondence includes the first group of correspondence and/or the second group of correspondence, and the network device may determine, based on the first group of correspondence or the second group of correspondence in Table 1, the first information corresponding to the time length of the first resource. For example, the first information 0 in the first group of correspondence is a TTI length of 0.5 milliseconds, and the time length 0, the time length 1 and the time length 2 that correspond to the first information 0 are respectively 3 symbols, 4 symbols and 5 symbols; and the first information 1 in the second group of correspondence is a TTI length of 1 millisecond, and the time length 3 and the time length 4 that correspond to the first information 1 are respectively 7 symbols and 9 symbols. When the time length that is of the first resource and that is determined by the network device is 7 symbols, because the time length 3 included in the second group of correspondence is 7 symbols, the network device uses the first information 1 corresponding to the time length 3 as the first information. In this application, the first correspondence may be preset, or may be notified by higher layer signaling. For example, the network device may save Table 1, or save the first group of correspondence and/or the second group of correspondence in Table 1.

In an embodiment, the network device determines, based on the second correspondence, the first information corresponding to the time length of the first resource. The second correspondence includes the correspondence between the first time length range and the first information, and the first time length range includes the first time length. Also referring to Table 2, Table 2 includes two groups of correspondence between the time length range and the first information. The first group of correspondence includes the correspondence between the time length range 0 and the first information 0, and the second group of correspondence includes the correspondence between the time length range 1 and the first information 1. The second correspondence includes the first group of correspondence and/or the second group of correspondence, and the network device may determine, based on the first group of correspondence or the second group of correspondence in Table 2, the first information corresponding to the time length of the first resource. For example, the first information 0 in the first group of correspondence is a TTI length of 0.5 milliseconds, and the time length range 0 corresponding to the first information 0 is 2 to 5 symbols; and the first information 1 in the second group of correspondence is a TTI length of 1 millisecond, and the time length range 1 corresponding to the first information 1 is 7 to 10 symbols. When the time length that is of the first resource and that is determined by the network device is 7 symbols, that is, belongs to the time length range 1 (7 to 10 symbols) included in the second group of correspondence, the network device uses the first information 1 corresponding to the time length range 1 as the first information. In this application, the second correspondence may be preset, or may be notified by higher layer signaling. For example, the network device may save Table 2, or save the first group of correspondence and/or the second group of correspondence in Table 2.

In an embodiment, the terminal device determines, based on a third correspondence, first information corresponding to the time length of the first resource. The third correspondence includes a correspondence between Q pieces of information and the time lengths of the first resource. The Q pieces of information include the first information, and Q is a positive integer. Table 3 includes two groups of correspondences between the time lengths and the first information. A first group of correspondence includes a correspondence between the time length 0 and two pieces of first information (the first information 0 and the first information 1), and the second group of correspondence includes a correspondence between the time length 1 and the first information 2. The third correspondence includes the first group of correspondence and/or the second group of correspondence, and the network device may determine, according to the first group of correspondence or the second group of correspondence in Table 3, the first information corresponding to the time length of the first resource. For example, the first information 0 in the first group of correspondence is a TI length of 3 symbols, the first information 1 is a TTI length of 0.5 milliseconds, and the time length 0 corresponding to the first information 0 and the first information 1 is 3 symbols; and the first information 2 in the second group of correspondence is a TTI length of 1 millisecond, and the time length 1 corresponding to the first information 2 is 7 symbols. When the time length of the first time domain resource determined by the network device is 7 symbols, because the time length 1 included in the second group of correspondence is 7 symbols, the network device uses the first information 2 corresponding to the time length 1 as the first information. When the time length of the first time domain resource determined by the network device is 3 symbols, because the time length 0 included in the second group of correspondence is 3 symbols, the network device uses the first information 0 and/or the first information 1 corresponding to the time length 0 as the first information. In this application, the third correspondence may be preset, or may be notified by higher layer signaling. For example, the network device may save Table 3, or save the first group of correspondence and/or the second group of correspondence in Table 3.

In addition, in addition to determining, based on the foregoing correspondences, the first information corresponding to the first time length, the network device may further determine the first information in another manner. For example, the first information corresponding to the first time length may be calculated by substituting a determined value of the first time length into a preset formula.

It should be noted that Table 1, Table 2 and Table 3 may be separate tables, or may be combined into a new table for use. This is not limited in the present invention. In addition, Table 1, Table 2 and Table 3 may also include a third group of correspondence, a fourth group of correspondence and the like, and a quantity of groups of correspondence is not limited in the present invention, either.

In the foregoing process, instead of actually receiving the first information, the network device determines the first information based on the first time length of the received scheduling request, to obtain information about the resource requested by the terminal device.

It should be noted that, in this embodiment of this application, the terminal device and the network device may respectively determine, based on a same correspondence, formula, or the like, or based on different correspondences, formulas, or the like, the first time length corresponding to the first information and the first information corresponding to the first time length.

It is worth mentioning that, in this embodiment of this application, a length of time domain resources of a resource that can be used to send the scheduling request is required to be greater than or equal to the first time length that can be determined by the terminal device. The resource used to send the scheduling request may be configured by the network device, or may be predefined. For example, the resource that is used to send the scheduling request and that is configured by the network device for the terminal device or predefined includes a frequency domain and/or code domain resource, but does not include a time domain resource, indicating that the terminal device can send scheduling request on any time domain resource. For example, in this embodiment of this application, the resource that is used to send the scheduling request and that is configured by the network device for the terminal device or predefined includes a frequency domain and/or code domain resource, so that the terminal device sends the scheduling request on the frequency domain resource and/or the code domain resource, and one or more scheduling requests of the terminal device all occupy the frequency domain resource and/or the code domain resource. Therefore, a plurality of scheduling requests of the terminal device may occupy a same frequency domain resource and code domain resource. For example, after step 302 in which the terminal device sends the scheduling request on the first resource, the terminal device sends another scheduling request on a second resource based on this embodiment of this application. Time domain resources of the second resource occupied by the another scheduling request are after the time domain resources of the first resource, and the another scheduling request is used to request another data transmission resource. In this case, the second resource occupied by the another scheduling request and the first resource have a same frequency domain resource and/or a same code domain resource. In the foregoing manner, the plurality of scheduling requests of the terminal device may occupy a same frequency domain resource and a same code domain resource, and system resources can be saved, so that the system can support more terminal devices in sending scheduling requests. It can be understood that the code domain resource may be a combination of one or more sequences, where different combination orders of sequences correspond to different code domain resources, and different sequences correspond to different code domain resources. In addition, in this embodiment of this application, a frequency domain and/or a code domain of a resource that can be used to send a scheduling request may also be determined in a manner in an existing LTE-A system. For example, the network device configures an index of a physical uplink control channel (PUCCH) resource for the terminal device, and the terminal device can calculate a frequency domain and/or a code domain of the uplink control channel resource based on the index, so that the terminal device sends the scheduling request in the frequency domain and/or the code domain. When receiving the scheduling request on the frequency domain and/or the code domain, the network device can determine that the terminal device sends the scheduling request. Certainly, in this embodiment of this application, the frequency domain and/or the code domain of the resource used to send the scheduling request may also be determined in another manner.

In the foregoing manner, the terminal device only sends the scheduling request, and does not need extra signaling. The terminal device not only can notify the network device that the terminal device request a data transmission resource, but also can notify the network device of information about the data transmission resource requested by the terminal device, so that the network device can schedule, based on the scheduling request for the terminal device, a resource applicable to data transmission by the terminal device, and a latency and signaling overheads are reduced. In addition, the terminal device determines, based on the first information, a time length of the scheduling request sent by the terminal device, and does not need the network device to allocate, to the terminal device, the periodic uplink control channel resource that can be used by the scheduling request. That is, the terminal device does not need to send the scheduling request based on the periodic uplink control channel resource, so that the terminal device can send the scheduling request in time, and the latency is reduced.

Optionally, after step 304, the network device may also perform step 305, and sends scheduling information to the terminal device based on the first information, to allocate the data transmission resource to the terminal device for data transmission. For example, the first information determined by the network device is a TTI length of 0.5 milliseconds. That is, the terminal device requests the data transmission resource with the TTI length of 0.5 milliseconds for data transmission. The network device may allocate, based on the first information, the data transmission with the TTI length of 0.5 milliseconds to the terminal device. However, if currently, there is no remaining data transmission resource with a TTI of 0.5 milliseconds in the network, and the network device determines that the data transmission resource with the TI length of 0.5 milliseconds cannot be allocated to the terminal device and only a data transmission resource with a TTI length of 1 millisecond can be allocated to the terminal device, the network device may also allocate the data transmission resource with the TTI length of 1 millisecond to the terminal device. Certainly, if the network device determines that the data transmission resource cannot be allocated to the terminal device, the network device may not allocate the data transmission resource to the terminal device. That is, the network device manages data transmission resource allocation, and the first information corresponding to the scheduling request sent by the terminal device may be used as reference when the network device allocates the data transmission resource.

Figure 5:
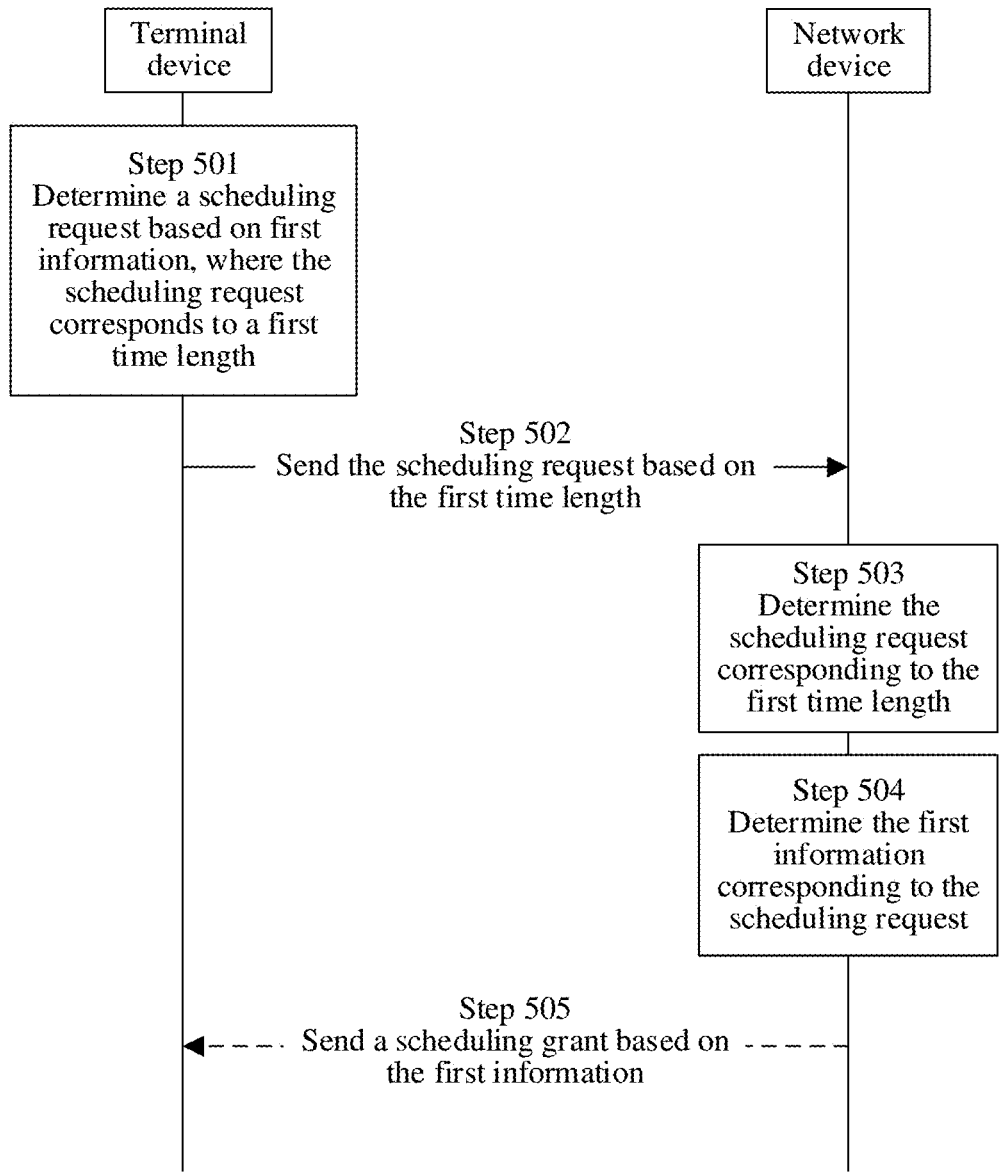
FIG. 5 is another schematic diagram of interaction between an information sending method and an information determining method according to this application.

FIG. 5 is a schematic flowchart of an information sending method and an information determining method according to this application. In FIG. 5, a terminal device and a network device communicate with each other to implement an information sending method and an information determining method provided in this application.

When needing to request a resource for data transmission, the terminal device performs the information sending method. In step 501, the terminal device determines a scheduling request based on first information, and the scheduling request corresponds to a first time length. The first information is information about the data transmission resource. The first information may include at least one of a TTI length, a subcarrier spacing and a priority of the data transmission resource requested by the terminal device. The data transmission resource may include at least one of a logical channel resource, a physical channel resource and a transmission channel resource, so that the first information includes at least one of information about the logical channel resource, information about the physical channel resource and information about the transmission channel resource. Refer to Table 4:

TABLE 4

| First information | Scheduling request |
|---|---|
| First information 0 | Scheduling request 0 |
| First information 1 | Scheduling request 1 |

Table 4 includes two groups of correspondence between the scheduling request and the first information. A first group of correspondence includes a correspondence between the scheduling request 0 and the first information 0, and a second group of correspondence includes a correspondence between the scheduling request 1 and the first information 1. The terminal device may determine the scheduling request based on the first information and the first group of correspondence or the second group of correspondence in Table 4. For example, if the first information is the first information 0, then the scheduling request determined by the terminal device is the scheduling request 0. If the first information is the first information 1, then the scheduling request determined by the terminal device is the scheduling request 1.

For example, the first information 0 in Table 4 is a TTI length of 0.5 milliseconds and a subcarrier spacing of 15 kHz, and the first information 1 is a subcarrier spacing of 60 kHz. When the first information is the TTI length of 0.5 milliseconds and the subcarrier spacing of 15 kHz, it indicates that the terminal device expects to request a resource with the TTI length of 0.5 milliseconds and the subcarrier spacing of 15 kHz. In this case, the terminal device determines, based on Table 4, that the scheduling request is the scheduling request 0. If the scheduling request 0 corresponds to the time length 0, then the first time length corresponding to the scheduling request is the time length 0. When the first information is a subcarrier spacing of 60 kHz, it indicates that the terminal device expects to request a resource with the subcarrier spacing of 60 kHz. In this case, the terminal device determines, based on Table 4, that the scheduling request is the scheduling request 1. If the scheduling request 1 corresponds to the time length 1, then the first time length corresponding to the scheduling request is the time length 1.

In an embodiment, the scheduling request and the first time length satisfy a fourth correspondence, and the fourth correspondence includes a correspondence between the scheduling request and P time lengths. P is an integer greater than or equal to 2, and the P time lengths include the first time length. Refer to Table 5:

TABLE 5

| Scheduling request | Time length |
| --- | --- |
| Scheduling request 0 | Time length 0 |
| | Time length 1 |
| | Time length 2 |
| Scheduling request 1 | Time length 3 |
| | Time length 4 |

Table 5 includes two groups of correspondence between the scheduling request and the time lengths. A first group of correspondence includes a correspondence between the scheduling request 0 and three time lengths (the time length 0, the time length 1 and the time length 2), and a second group of correspondence includes a correspondence between the scheduling request 1 and two time lengths (the time length 3 and the time length 4). The fourth correspondence includes the first group of correspondence and/or the second group of correspondence, and the scheduling request determined by the terminal device and the first time length corresponding to the scheduling request satisfying one group of correspondence in Table 5. For example, the time length 0, the time length 1 and the time length 2 that correspond to the scheduling request 0 in the first group of correspondence are respectively 3 symbols, 4 symbols and 5 symbols; and the time length 3 and the time length 4 that correspond to the scheduling information 1 in the second group of correspondence are respectively 7 symbols and 14 symbols. When the scheduling request determined by the terminal device is the scheduling request 1, because the scheduling request 1 included in the second group of correspondence corresponds to the time length 3 and the time length 4, the first time length corresponding to the scheduling request 1 is 7 symbols of the time length 3 or 14 symbols of the time length 4. In this application, the fourth correspondence may be preset, or may be notified by higher layer signaling. For example, the terminal device may save Table 5, or save the first group of correspondence and/or the second group of correspondence in Table 5.

In an embodiment, the scheduling request and the first time length satisfy a fifth correspondence, and the fifth correspondence includes a correspondence between the scheduling request and a first time length range. The first time length range includes the first time length. Refer to Table 6:

TABLE 6

| Scheduling request | Time length range |
| --- | --- |
| Scheduling request 0 | Time length range 0 |
| Scheduling request 1 | Time length range 1 |

Table 6 includes two groups of correspondence between the scheduling request and the time length range. A first group of correspondence includes a correspondence between the scheduling request 0 and the time length range 0, and a second group of correspondence includes a correspondence between the scheduling request 1 and the time length range 1. The fifth correspondence includes the first group of correspondence and/or the second group of correspondence, and the scheduling request determined by the terminal device and the first time length corresponding to the scheduling request satisfying one group of correspondence in Table 6. For example, the time length range 0 corresponding to the scheduling request 0 in the first group of correspondence is 2 to 5 symbols; and the time length range 1 corresponding to the scheduling request 1 in the second group of correspondence is 7 to 10 symbols. When the scheduling request determined by the terminal device is the scheduling request 1, the first time length corresponding to the scheduling request 1 is 7 to 10 symbols belonging to the time length range 1. In this application, the fifth correspondence may be preset, or may be notified by higher layer signaling. For example, the terminal device may save Table 6, or save the first group of correspondence and/or the second group of correspondence in Table 6.

In an embodiment, the scheduling request and the first time length satisfy a sixth correspondence, and the sixth correspondence includes a correspondence between Q scheduling requests and the first time length. Q is a positive integer, and the Q scheduling requests include the scheduling request determined by the terminal device. Refer to Table 7:

TABLE 7

| Scheduling request | Time length |
| --- | --- |
| Scheduling request 0 | Time length 0 |
| Scheduling request 1 | |
| Scheduling request 2 | Time length 1 |

Table 7 includes two groups of correspondence between the scheduling requests and the time length. A first group of correspondence includes a correspondence between two scheduling requests (the scheduling request 0 and the scheduling request 1) and the time length 0, and a second group of correspondence includes a correspondence between the scheduling request 2 and the time length 1. The sixth correspondence includes the first group of correspondence and/or the second group of correspondence, and the scheduling request determined by the terminal device and the first time length corresponding to the scheduling request satisfying one group of correspondence in Table 7. For example, the time length 0 corresponding to the scheduling request 0 and the scheduling request 1 in the first group of correspondence is 3 symbols; and the time length 1 corresponding to the scheduling request 2 in the second group of correspondence is 7 symbols. When the scheduling request determined by the terminal device is the scheduling request 2, the time length 1 corresponding to the scheduling request 2 is 7 symbols, and the first time length corresponding to the scheduling request is the time length 1, that is, 7 symbols. In this application, the sixth correspondence may be preset, or may be notified by higher layer signaling. For example, the terminal device may save Table 7, or save the first group of correspondence and/or the second group of correspondence in Table 7.

In step 502, the terminal device sends the scheduling request on a first resource, and a time length of the first resource is equal to the first time length. For example, the first information is a TTI length of 0.5 milliseconds, the scheduling request corresponding to the first information is the scheduling request 0, and the time length corresponding to the scheduling request 0 is 3 symbols. The first information is a subcarrier spacing of 60 kHz, the scheduling request corresponding to the first information is the scheduling request 1, and the time length corresponding to the scheduling request 1 is 7 symbols. Returning to FIG. 3, if the first information is a subcarrier spacing of 60 kHz, that is, the terminal device requests a data transmission resource with the subcarrier spacing of 60 kHz, then the scheduling request that is determined by the terminal device and that corresponds to the first information is the scheduling request 1, and the time length corresponding to the scheduling request 1 is 7 symbols. Therefore, the first time length corresponding to the scheduling request is 7 symbols. The terminal device sends the scheduling request on the shaded area of the time domain resources shown in FIG. 4. The shaded area shown in FIG. 4 includes 7 symbols in total. That is, the time length of the first resource carrying the scheduling request is 7 symbols, the same as the first time length, so that the terminal device requests, by sending the scheduling request with a time length of 7 symbols, a data transmission resource with a subcarrier spacing of 60 kHz from a base station to transmit data. In this process, the terminal device sends the scheduling request corresponding to the first information instead of actually sending the first information, to report information about the requested resource to the network device.

Because the network device detects the scheduling request on the resource shown in FIG. 4, after the terminal device performs step 502 to send the scheduling request, the network device can detect the scheduling request sent by the terminal device. Returning to FIG. 5, after the terminal device sends the scheduling request, in step 503, the network device determines the scheduling request corresponding to the first time length, and the time length of the first resource on which the scheduling request is located is the first time length, and the scheduling request is used to request the data transmission resource. It is worth mentioning that in a process of determining the scheduling request corresponding to the first time length in step 503, the network device can determine the first time length. That is, the network device can determine, in a process of detecting the scheduling request on the resource, the time length of the first resource occupied by the received scheduling request. Also referring to FIG. 4, symbols that are occupied by the scheduling request sent by the terminal device and that are detected by the network device are the 7 symbols in the shaded area in FIG. 4. If a time length of 3 symbols corresponds to the scheduling request 0, and a time length of 7 symbols corresponds to the scheduling request 1, then the network device determines that the scheduling request corresponding to the 7 symbols is the scheduling request 1. The network device may determine, based on the foregoing fourth correspondence, the fifth correspondence or the sixth correspondence, the scheduling request corresponding to the first time length of the received first resource. For example, if the time length of 3 symbols corresponds to the scheduling request 2, and the time length of 7 symbols corresponds to the scheduling request 0 and the scheduling request 1, then the network device determines that the scheduling requests corresponding to the 7 symbols include the scheduling request 0 and the scheduling request 1. The network device may determine, based on the foregoing sixth correspondence, the scheduling request corresponding to the received first time length of the first resource. The scheduling requests include the scheduling request 0 and the scheduling request 1. In addition, the network device may also determine, in another manner, the scheduling request corresponding to the first time length. For example, the scheduling request corresponding to the first time length is calculated by substituting a value of the first time length into a preset formula.

In step 504, the network device determines the first information corresponding to the scheduling request. Returning to Table 4, the network device may determine the first information based on the scheduling request and the first group of correspondence or the second group of correspondence in Table 4, and the first information includes information about the data transmission resource. For example, if the scheduling request is the scheduling request 0, then the first information determined by the network device is the first information 0. If the scheduling request is the scheduling request 1, then the first information determined by the network device is the first information 1.

For example, information corresponding to the scheduling request determined by the network device, that is, the scheduling request 1, is a subcarrier spacing of 60 kHz. Then, the network device determines that the first information corresponding to the scheduling request is the subcarrier spacing of 60 kHz. That is, the network device determines that the terminal device requests a data transmission resource with a subcarrier spacing of 60 kHz. In the foregoing process, instead of actually receiving the first information, the network device determines the scheduling request based on the time length of the resource occupied by the received scheduling request, thereby determining the first information corresponding to the scheduling request, to obtain information about the data transmission resource requested by the terminal device.

In an embodiment, the first information includes at least one of the following: a maximum TTI length of the data transmission resource, a minimum TTI length of the data transmission resource, a maximum subcarrier spacing of the data transmission resource, and a minimum subcarrier spacing of the data transmission resource.

For example, the first information corresponding to the scheduling request determined by the network device, that is, the scheduling request 1, is a subcarrier spacing with a maximum value of 60 kHz. That is, the network device determines that the first information corresponding to the scheduling request is the subcarrier spacing with a maximum value of 60 kHz. That is, the network device determines that the terminal device requests a data transmission resource with a subcarrier spacing of less than or equal to 60 kHz. In the foregoing process, instead of actually receiving the first information, the network device determines the scheduling request based on the time length of the resource occupied by the received scheduling request, thereby determining the first information corresponding to the scheduling request, to obtain information about the data transmission resource requested by the terminal device.

Optionally, after step 504, the network device may also perform step 505, and sends a scheduling grant to the terminal device based on the first information, to allocate the data transmission resource to the terminal device for data transmission. For example, the first information is a TTI length of 0.5 milliseconds. That is, the terminal device requests the data transmission resource with the TTI length of 0.5 milliseconds for data transmission. The network device may allocate, based on the first information, the data transmission with the TI length of 0.5 milliseconds to the terminal device. However, if currently, there is no remaining data transmission resource with a TTI of 0.5 milliseconds in the network, and the network device determines that the data transmission resource with the TTI length of 0.5 milliseconds cannot be allocated to the terminal device and only a data transmission resource with a TTI length of 1 millisecond can be allocated to the terminal device, the network device may also allocate the data transmission resource with the TTI length of 1 millisecond to the terminal device. Certainly, if the network device determines that the data transmission resource cannot be allocated to the terminal device, the network device may not allocate the data transmission resource to the terminal device. That is, the network device manages data transmission resource allocation, and the first information corresponding to the scheduling request sent by the terminal device may be used as reference when the network device allocates the data transmission resource.

In an embodiment of this application, that the terminal device sends the scheduling request on the first resource includes: sending, by the terminal device based on second information, the scheduling request on the first resource. Correspondingly, the network device detects the scheduling request based on the second information. Optionally, the terminal device sends the second information based on a first power threshold. Correspondingly, the network device detects the second information based on the third power threshold. The second information includes at least one of a first sequence, a first pattern, first power information and first scrambling code information. The first sequence may be one sequence or a combination of a plurality of sequences. For example, the first sequence is a specific ZC sequence, or a specific combination of a plurality of ZC sequences. The first pattern may be a frequency domain pattern and/or a time domain pattern. For example, the frequency domain pattern is a frequency domain pattern with continuous subcarriers, or a frequency domain pattern with uniform gap subcarriers, or a frequency domain pattern with non-uniform gap subcarriers. The frequency domain pattern with continuous subcarriers is a pattern with continuous subcarrier index numbers. A spacing in the frequency domain pattern with uniform gap subcarriers may be 1 or 2 or 3 subcarriers. The time domain pattern may be a time domain pattern with continuous symbols, or a time domain pattern with uniform gap symbols, or a time domain pattern with non-uniform gap symbols. The first power information may be a transmit power. The first scrambling code information may be scrambling code information corresponding to the terminal device, or scrambling code information corresponding to the network device, or scrambling code information corresponding to the scheduling request. Referring to FIG. 4 again, for example, the second information includes one or more first sequences, and the plurality of first sequences may be the same, or may be different. A sequence of sending the plurality of first sequences may be predefined, or calculated by the terminal device, or notified by higher layer signaling. The first sequence occupies all of subcarriers of 1 symbol or some of the subcarriers on one symbol. The terminal device sends the first sequence on the resource corresponding to shaded symbols on the resource shown in FIG. 4, to send the scheduling request. In this case, a time length of the first resource occupied by the sent first sequence is equal to the first time length, that is, 7 symbols. Correspondingly, the network device detects the first sequence on the resource, to determine that the first time length of the resource carrying the scheduling request is 7 symbols. Alternatively, a time length between the first resources occupied by the sent first sequences is equal to the first time length, and the first time length is 7 symbols. Correspondingly, the network device detects the first sequence on the resource, to determine that the first time length of the resource carrying the scheduling request is 7 symbols. Alternatively, the second information includes the first sequence and the first power information. The terminal device sends, based on the first power information or the first power threshold, the first sequence on the resource corresponding to shaded symbols shown in FIG. 4. The first power information may be offset information of the transmit power, and the first power threshold may be a transmit power threshold. Correspondingly, the network device detects the first sequence on the time domain resources based on the third power threshold, to determine that the time length of the first resource carrying the scheduling request is 7 symbols. The third power threshold may be a receive power threshold.

Figure 6:
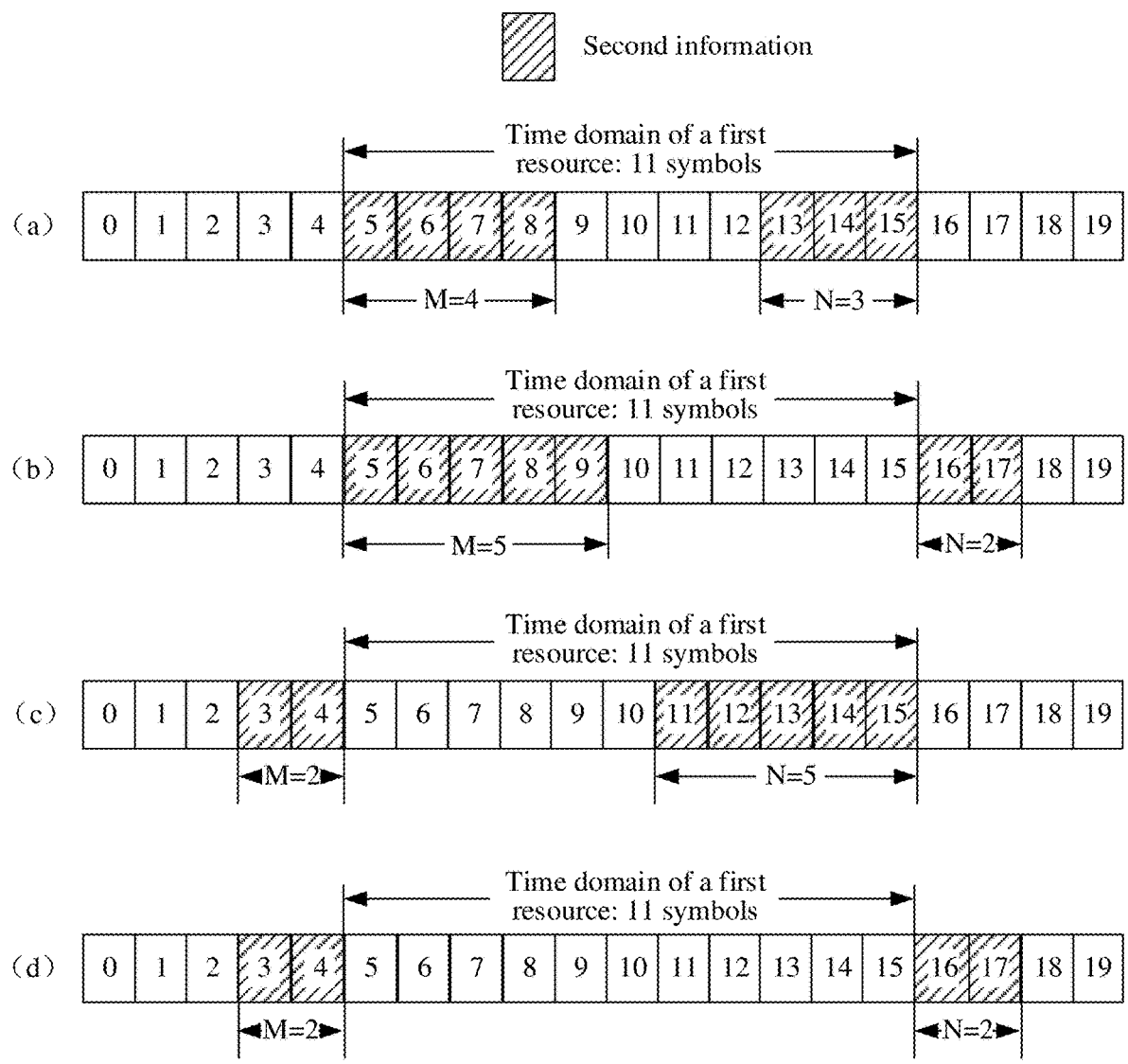
FIG. 6 is another schematic diagram of time domain resource occupation during implementation of an information sending method and an information determining method according to this application.

In an embodiment of this application, the terminal device sends, based on the time domain resources occupied by the second information, the scheduling request on the first resource. Correspondingly, the network device determines, based on the time domain resources occupied by the second information, the first time length of the first resource carrying the scheduling request. FIG. 6 is a schematic diagram of time domain resource occupation during implementation of an embodiment of an information sending method and an information determining method in this application. Same as FIG. 4, in FIG. 6 and subsequent FIG. 7, FIG. 8 and FIG. 9, time domain resources that can be used to send the scheduling request are schematically indicated by horizontally continuous cells. Each cell represents a time unit of the time domain resources, and a frequency domain and/or code domain resource corresponding to the time domain resource is not shown. In this application, an example in which each cell represents a time unit of one symbol is used for description. Apparently, a time length of each cell may also be a time length of any time unit, such as a plurality of symbols, 0.5 milliseconds, one or more timeslots, 1 millisecond, and one or more subframes. Different from FIG. 4, for ease of description of the embodiments of this application, continuous cells in FIG. 6 and subsequent FIG. 7, FIG. 8 and FIG. 9 are respectively numbered as 0 to 19, and these numbers do not have other additional meanings.

In an embodiment, that the terminal device sends, based on the time domain resources occupied by the second information, the scheduling request on the first resource includes: the time domain resources occupied by the second information include first M symbols in time domain resources of the first resource and last N symbols in the time domain resources of the first resource, and the first time length is a quantity of symbols from the M symbols to the N symbols. Referring to FIG. 6(a), the first time length determined by the terminal device is 11 symbols. Therefore, when the terminal device sends the scheduling request, a time length of the time domain resources of the first resource used by the terminal device to carry the scheduling request is 11 symbols (symbols 5 to 15, 11 symbols in total). Because M=4, and N=3, the terminal device sends the second information on the first 4 symbols (the symbols 5 to 8) in the time domain resources of the first resource and the last 3 symbols (the symbols 13 to 15) in the time domain resources of the first resource. Correspondingly, when detecting the scheduling request on the resource shown in FIG. 6(a), the network device determines that the first time length is a quantity of symbols from the M symbols to the N symbols. That is, the network device determines that the first time length is the symbol 5 to the symbol 15, 11 symbols in total. It is worth mentioning that M and N are positive integers in this example, and M+N≤the first time length. When M+N<the first time length, other symbols (the symbols 9 to 12) in the time domain resources of the first resource other than the M and N symbols may be used to send other information different from the second information, or may not be used to send any information.

In an embodiment, that the terminal device sends, based on the time domain resources occupied by the second information, the scheduling request on the first resource includes: the time domain resources occupied by the second information include first M symbols in time domain resources of the first resource and N symbols after the time domain resources of the first resource, and the first time length is a sum of a quantity of symbols between the M symbols and the N symbols and a quantity of the M symbols. The terminal device further sends the second information on the N symbols. Referring to FIG. 6(b), the first time length determined by the terminal device is 11 symbols. Therefore, when the terminal device sends the scheduling request, a time length of the time domain resources of the first resource used by the terminal device to carry the scheduling request is 11 symbols (symbols 5 to 15, 11 symbols in total). Because M=5, and N=2, the terminal device sends the second information on the first 5 symbols (the symbols 5 to 9) in the time domain resources of the first resource and the 2 symbols (the symbols 16 to 17) after the time domain resources of the first resource. Correspondingly, when detecting the scheduling request on the resource shown in FIG. 6(b), the network device determines that the first time length is a quantity of symbols between the M symbols and the N symbols. That is, the network device determines that the first time length is the symbol 5 to the symbol 15, 11 symbols in total. It is worth mentioning that M and N are positive integers in this example, and M≤the first time length. When M<the first time length, other symbols (the symbols 10 to 15) in the time domain resources of the first resource other than the M symbols may be used to send other information different from the second information, or may not be used to send any information.

In an embodiment, that the terminal device sends, based on the time domain resources occupied by the second information, the scheduling request on the first resource includes: the time domain resources occupied by the second information include M symbols before time domain resources of the first resource and last N symbols in the time domain resources of the first resource, and the first time length is a sum of a quantity of symbols between the M symbols and the N symbols and a quantity of the N symbols. The terminal device further sends the second information on the M symbols. Referring to FIG. 6(c), the first time length determined by the terminal device is 11 symbols. Therefore, when the terminal device sends the scheduling request, a time length of the time domain resources of the first resource used by the terminal device to carry the scheduling request is 11 symbols (the symbols 5 to 15, 11 symbols in total). Because M=2, and N=5, the terminal device sends the second information on the 2 symbols (the symbols 3 and 4) before the time domain resources of the first resource and the last 5 symbols (the symbols 11 to 15) in the time domain resources of the first resource. Correspondingly, when detecting the scheduling request on the resource shown in FIG. 6(c), the network device determines that the first time length is a quantity of symbols from a symbol after the M symbols to the N symbols. That is, the network device determines that the first time length is the symbol 5 to the symbol 15, 11 symbols in total. It is worth mentioning that M and N are positive integers in this example, and N≤the first time length. When N<the first time length, other symbols (the symbols 5 to 10) in the time domain resources of the first resource other than the N symbols may be used to send other information different from the second information, or may not be used to send any information.

In an embodiment, that the terminal device sends, based on the time domain resources occupied by the second information, the scheduling request on the first resource includes: the time domain resources occupied by the second information include M symbols before time domain resources of the first resource and N symbols after the time domain resources of the first resource, and the first time length is a quantity of symbols between the M symbols and the N symbols. The terminal device further sends the second information on the M symbols and the N symbols. Referring to FIG. 6(c), the first time length determined by the terminal device is 11 symbols. Therefore, when the terminal device sends the scheduling request, a time length of the time domain resources of the first resource used by the terminal device to carry the scheduling request is 11 symbols (the symbols 5 to 15, 11 symbols in total). Because M=2, and N=2, the terminal device sends the second information on the 2 symbols (the symbols 3 and 4) before the time domain resources of the first resource and the 2 symbols (the symbols 16 and 17) after the time domain resources of the first resource. Correspondingly, when detecting the scheduling request on the resource shown in FIG. 6(d), the network device determines that the first time length is a quantity of symbols from a symbol after the M symbols to a symbol before the N symbols. That is, the network device determines that the first time length is the symbol 5 to the symbol 15, 11 symbols in total. It is worth mentioning that M and N are positive integers in this example. Because the terminal device sends the scheduling request on the first resource, the terminal device sends, on at least one symbol in the symbols of the first resource between the M symbols and the N symbols, other information different from the second information. Certainly, if the terminal device sends the second information only on the M symbols and the N symbols and does not send any information on the first resource between the M symbols and the N symbols, it may also be considered that the terminal device sends the scheduling request on the first resource, and the scheduling request is indicated by second information of the M symbols before the first resource and second information of the N symbols after the first resource.

In the four embodiments provided in FIG. 6(a), FIG. 6(b), FIG. 6(c) and FIG. 6(d), the terminal device may also send other information on all or some of the symbols between the M symbols and the N symbols, and the other information may be, for example, at least one of a sequence, a pattern, power information, scrambling code information and data. In this case, a manner of determining the first time length is the same as determining manners in the four embodiments provided in FIG. 6(a), FIG. 6(b), FIG. 6(c) and FIG. 6(d), and details are not described herein again. Other information is sent on all or some of the symbols between the M symbols and the N symbols, so that a success rate of detecting the scheduling request by the network device can be increased.

In an embodiment of this application, the time domain resources of the first resource include time domain resources occupied by third information. The third information includes at least one of a second sequence, a second pattern, second power information, second scrambling code information and data, and the third information is different from the second information. That the terminal device sends, based on the time domain resources occupied by the second information, the scheduling request on the first resource includes: sending, by the terminal device, the scheduling request on the first resource based on the time domain resources occupied by the second information and the time domain resources occupied by the third information. Correspondingly, the network device determines the first time length based on the time domain resources occupied by the second information and the time domain resources occupied by the third information. Optionally, the terminal device sends third information based on a second power threshold. Correspondingly, the network device detects the third information based on the fourth power threshold.

Figure 7:
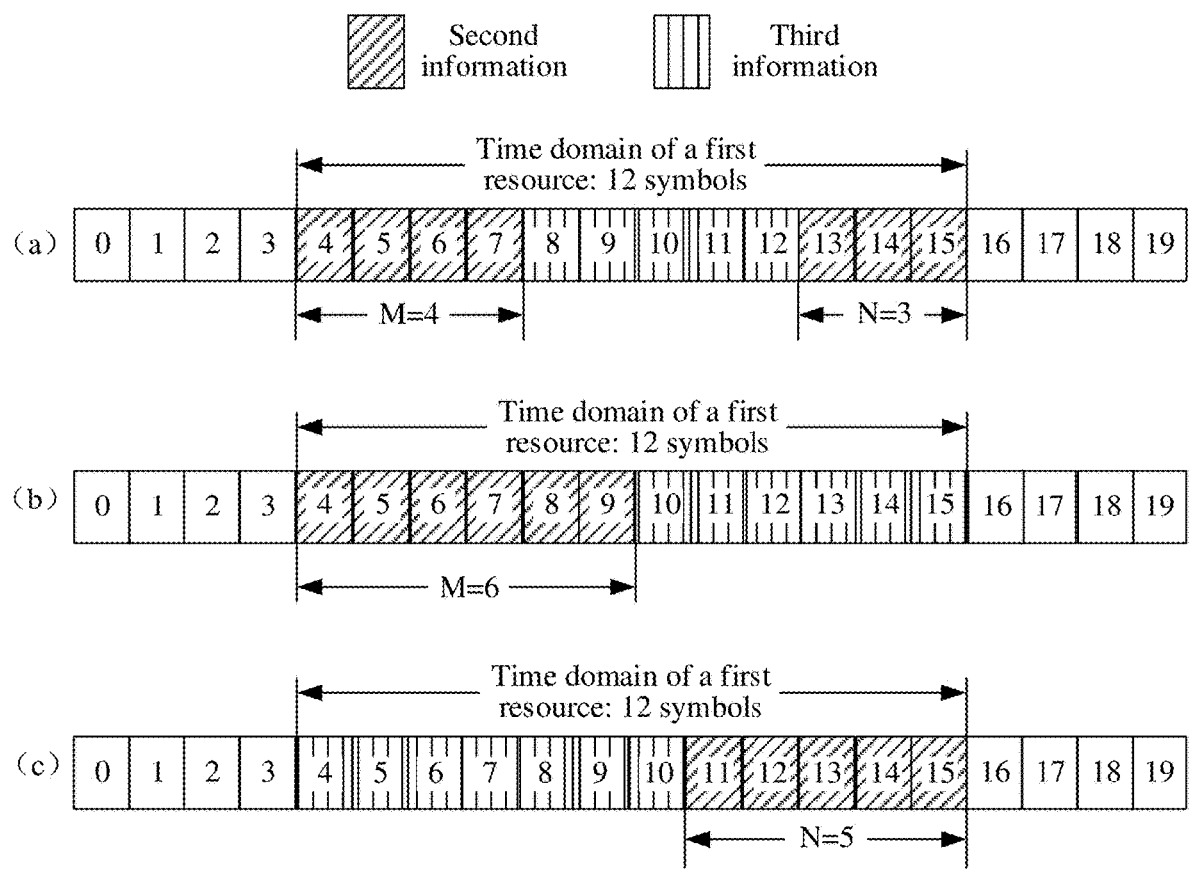
FIG. 7 is still another schematic diagram of time domain resource occupation during implementation of an information sending method and an information determining method according to this application.

FIG. 7 is a schematic diagram of time domain resource occupation during implementation of an embodiment of the information sending method and the information determining method of this application.

In an embodiment, the sending, by the terminal device, the scheduling request on the first resource based on the time domain resources occupied by the second information and the time domain resources occupied by the third information includes: the time domain resources occupied by the second information include first M symbols in time domain resources of the first resource and last N symbols in the time domain resources of the first resource, and the first time length is a sum of a quantity of symbols occupied by the third information, a quantity of the M symbols and a quantity of the N symbols. Referring to FIG. 7(a), the first time length determined by the terminal device is 12 symbols. Therefore, when the terminal device sends the scheduling request, a time length of the time domain resources of the first resource used by the terminal device to carry the scheduling request is 12 symbols (the symbols 4 to 15, 12 symbols in total). Because M=4, and N=3, the terminal device sends the second information on the first 4 symbols (the symbols 4 to 7) in the time domain resources of the first resource and the last 3 symbols (the symbols 13 to 15) in the time domain resources of the first resource, and the terminal device sends the third information on the symbols (the symbols 8 to 12) between the M symbols and the N symbols. Correspondingly, when detecting the scheduling request on the resource shown in FIG. 7(a), the network device determines that the first time length is a sum (the symbols 4 to 15, 12 symbols in total) of the quantity of the symbols occupied by the third information, the quantity of the M symbols and the quantity of the N symbols. It is worth mentioning that M and N are positive integers in this example, and M+N<the first time length. In addition, the terminal device sends at least one piece of third information on other symbols in the time domain resources of the first resource other than the M and N symbols. For example, in FIG. 7(a), the terminal device may send the third information merely on some of the symbols. For example, the terminal device sends the third information on the symbol 8, and does not send any information on the symbols 9 to 12. In this case, the network device determines that the first time length is the quantity of the M symbols+the quantity of the N symbols+the quantity of the symbols occupied by the third information. That is, the network device determines that the first time length is 8 (4+3+1) symbols.

In an embodiment, the sending, by the terminal device, the scheduling request on the first resource based on the time domain resources occupied by the second information and the time domain resources occupied by the third information includes: the time domain resources occupied by the second information include first M symbols in time domain resources of the first resource, and the first time length is a sum of a quantity of symbols occupied by the third information, and a quantity of the M symbols. Referring to FIG. 7(b), the first time length determined by the terminal device is 12 symbols. Therefore, when the terminal device sends the scheduling request, a time length of the time domain resources of the first resource used by the terminal device to carry the scheduling request is 12 symbols (the symbols 4 to 15, 12 symbols in total). Because M=6, the terminal device sends the second information on the first 6 symbols (the symbols 4 to 9) in the time domain resources of the first resource, and the terminal device sends the third information on other symbols (the symbols 10 to 15) in the time domain resources of the first resource other than the M symbols. Correspondingly, when detecting the scheduling request on the resource shown in FIG. 7(b), the network device determines that the first time length is a sum (the symbols 4 to 15, 12 symbols in total) of the quantity of the symbols occupied by the third information, and the quantity of the M symbols. It is worth mentioning that M is a positive integer in this example, and M<the first time length. In addition, the terminal device sends at least one piece of third information on other symbols in the time domain resources of the first resource other than the M symbols. For example, in FIG. 7(b), the terminal device may send the third information merely on the symbol 13, and does not send any information on the symbols 10, 11, 14 and 15. In this case, the network device determines that the first time length is the quantity of the M symbols+the quantity of the symbols occupied by the third information. That is, the network device determines that the first time length is 7 (6+1) symbols.

In an embodiment, the sending, by the terminal device, the scheduling request on the first resource based on the time domain resources occupied by the second information and the time domain resources occupied by the third information includes: the time domain resources occupied by the second information include last N symbols in time domain resources of the first resource, and the first time length is a sum of a quantity of symbols occupied by the third information, and a quantity of the N symbols. Referring to FIG. 7(c), the first time length determined by the terminal device is 12 symbols. Therefore, when the terminal device sends the scheduling request, a time length of the time domain resources of the first resource used by the terminal device to carry the scheduling request is 12 symbols (the symbols 4 to 15, 12 symbols in total). Because N=5, the terminal device sends the second information on the last 5 symbols (the symbols 11 to 15) in the time domain resources of the first resource, and the terminal device sends the third information on other symbols (the symbols 4 to 10) in the time domain resources of the first resource other than the N symbols. Correspondingly, when detecting the scheduling request on the resource shown in FIG. 7(c), the network device determines that the first time length is a sum (the symbols 4 to 15, 12 symbols in total) of the quantity of the symbols occupied by the third information, and the quantity of the N symbols. It is worth mentioning that N is a positive integer in this example, and N<the first time length. In addition, the terminal device sends at least one piece of third information on other symbols in the time domain resources of the first resource other than the N symbols. For example, in FIG. 7(c), the terminal device may send the third information merely on the symbol 4, and does not send any information on the symbols 5 to 10. In this case, the network device determines that the first time length is the quantity of the N symbols+the quantity of the symbols occupied by the third information. That is, the network device determines that the first time length is 6 (5+1) symbols.

Figure 8:
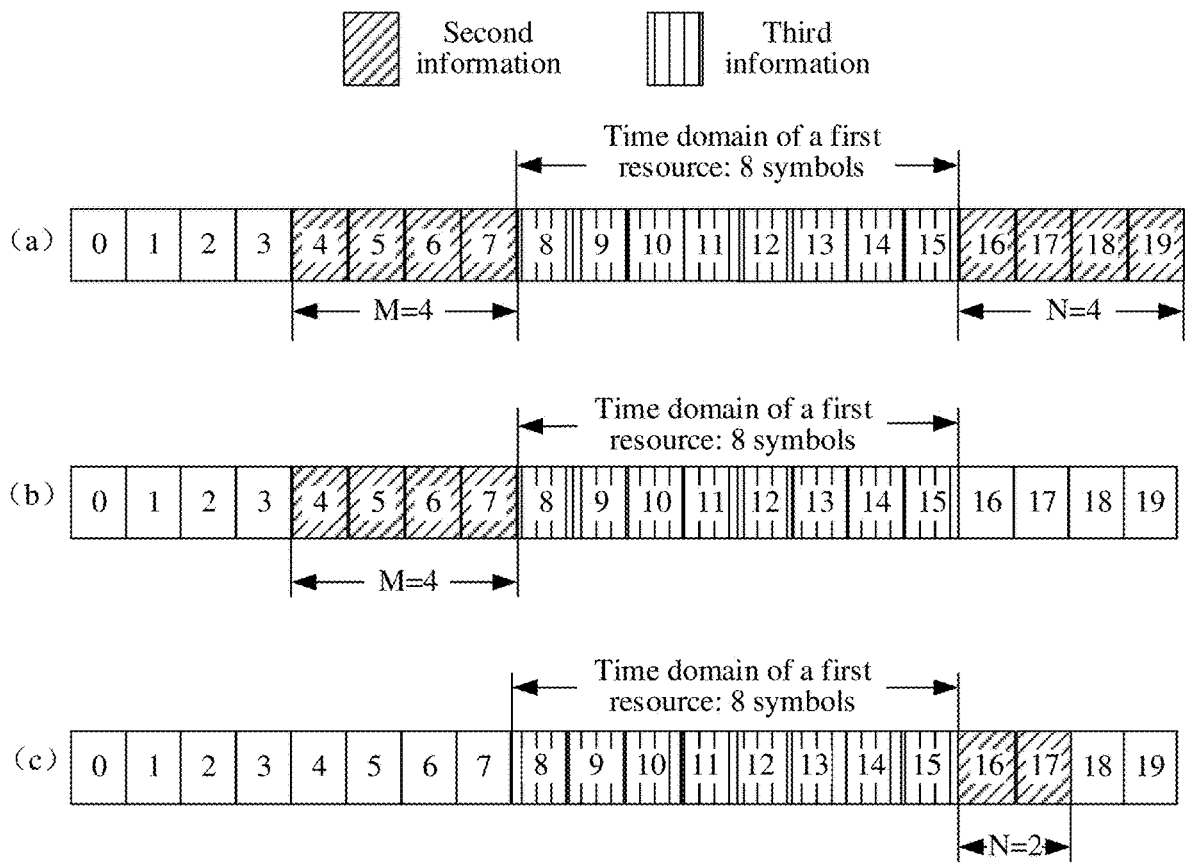
FIG. 8 is yet another schematic diagram of time domain resource occupation during implementation of an information sending method and an information determining method according to this application.

FIG. 8 is a schematic diagram of time domain resource occupation during implementation of an embodiment of the information sending method and the information determining method of this application.

In an embodiment, the sending, by the terminal device, the scheduling request on the first resource based on the time domain resources occupied by the second information and the time domain resources occupied by the third information includes: the time domain resources occupied by the second information include M symbols before time domain resources of the first resource and N symbols after the time domain resources of the first resource, and the first time length is a quantity of symbols occupied by the third information. The terminal device further sends the second information on the M symbols and the N symbols. Referring to FIG. 8(a), the first time length determined by the terminal device is 8 symbols. Therefore, when the terminal device sends the scheduling request, a time length of the time domain resources of the first resource used by the terminal device to carry the scheduling request is 8 symbols (the symbols 8 to 15, 8 symbols in total). Because M=4, and N=3, the terminal device sends the second information on the 4 symbols (the symbols 4 to 7) before the time domain resources of the first resource and the 4 symbols (the symbols 16 to 19) after the time domain resources of the first resource, and the terminal device sends the third information on the time domain resources (the symbols 8 to 15) of the first resource between the M symbols and the N symbols. Correspondingly, when detecting the scheduling request on the resource shown in FIG. 8(a), the network device determines that the first time length is a quantity of symbols (the symbols 8 to 15, 8 symbols in total) occupied by the third information. It is worth mentioning that M and N are positive integers in this example. In addition, the terminal device sends at least one piece of third information on the time domain resources of the first resource. For example, in FIG. 8(a), the terminal device may send the third information merely on the symbol 8, and does not send any information on the symbols 9 to 15. In this case, the network device determines that the first time length is the quantity of the symbols occupied by the third information. That is, the network device determines that the first time length is 1 symbol.

In an embodiment, the sending, by the terminal device, the scheduling request on the first resource based on the time domain resources occupied by the second information and the time domain resources occupied by the third information includes: the time domain resources occupied by the second information include M symbols before time domain resources of the first resource, and the network device determines that the first time length is a quantity of symbols occupied by the third information. The terminal device further sends the second information on the M symbols. Referring to FIG. 8(b), the first time length determined by the terminal device is 8 symbols. Therefore, when the terminal device sends the scheduling request, a time length of the time domain resources of the first resource used by the terminal device to carry the scheduling request is 8 symbols (the symbols 8 to 15, 8 symbols in total). Because M=4, the terminal device sends the second information on the first 4 symbols (the symbols 4 to 7) in the time domain resources of the first resource, and the terminal device sends the third information on the time domain resources (the symbols 8 to 15) of the first resource after the M symbols. Correspondingly, when detecting the scheduling request on the resource shown in FIG. 8(b), the network device determines that the first time length is the quantity of symbols (the symbols 8 to 15, 8 symbols in total) occupied by the third information. It is worth mentioning that M is a positive integer in this example. In addition, the terminal device sends at least one piece of third information on the time domain resources of the first resource. For example, in FIG. 8(b), the terminal device may send the third information merely on the symbols 8 to 12, and does not send any information on the symbols 13 to 15. In this case, the network device determines that the first time length is the quantity of the symbols occupied by the third information. That is, the network device determines that the first time length is 5 symbols.

In an embodiment, the sending, by the terminal device, the scheduling request on the first resource based on the time domain resources occupied by the second information and the time domain resources occupied by the third information includes: the time domain resources occupied by the second information include N symbols after time domain resources of the first resource, and the first time length is a quantity of symbols occupied by the third information. The terminal device further sends the second information on the N symbols. Referring to FIG. 8(c), the first time length determined by the terminal device is 8 symbols. Therefore, when the terminal device sends the scheduling request, a time length of the time domain resources of the first resource used by the terminal device to carry the scheduling request is 8 symbols (the symbols 8 to 15, 8 symbols in total). Because N=2, the terminal device sends the second information on the 2 symbols (the symbols 16 and 17) after the time domain resources of the first resource, and the terminal device sends the third information on the time domain resources (the symbols 8 to 15) of the first resource before the N symbols. Correspondingly, when detecting the scheduling request on the resource shown in FIG. 8(c), the network device determines that the first time length is the quantity of symbols (the symbols 8 to 15, 8 symbols in total) occupied by the third information. It is worth mentioning that N is a positive integer in this example. In addition, the terminal device sends at least one piece of third information on time domain resources other than the N symbols in the time domain resources of the first resource. For example, in FIG. 8(c), the terminal device may send the third information merely on the symbols 9 to 15, and does not send any information on the symbol 8. In this case, the network device determines that the first time length is a quantity of the symbols occupied by the third information. That is, the network device determines that the first time length is 7 symbols.

Figure 9:
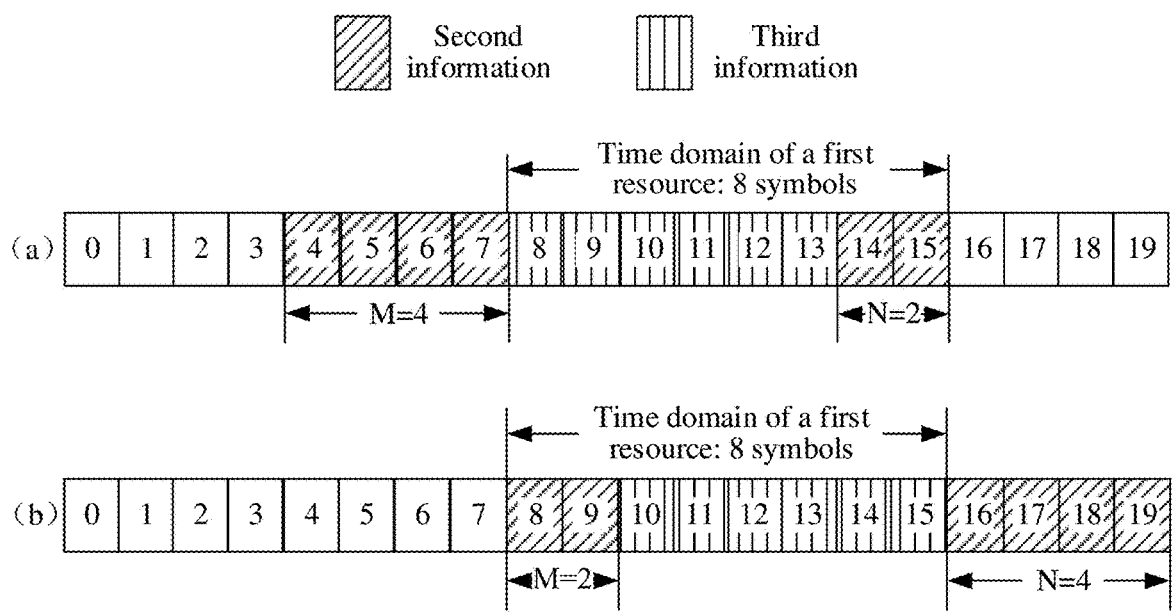
FIG. 9 is still yet another schematic diagram of time domain resource occupation during implementation of an information sending method and an information determining method according to this application.

FIG. 9 is a schematic diagram of time domain resource occupation during implementation of an embodiment of the information sending method and the information determining method of this application.

In an embodiment, the sending, by the terminal device, the scheduling request on the first resource based on the time domain resources occupied by the second information and the time domain resources occupied by the third information includes: the time domain resources occupied by the second information include M symbols before time domain resources of the first resource and last N symbols in the time domain resources of the first resource, and the first time length is a sum of a quantity of symbols occupied by the third information and a quantity of the N symbols. The terminal device further sends the second information on the M symbols. Referring to FIG. 9(a), the first time length determined by the terminal device is 8 symbols. Therefore, when the terminal device sends the scheduling request, a time length of the time domain resources of the first resource used by the terminal device to carry the scheduling request is 8 symbols (the symbols 8 to 15, 8 symbols in total). Because M=4, and N=2, the terminal device sends the second information on the 4 symbols (the symbols 4 to 7) before the time domain resources of the first resource and the last 2 symbols (the symbols 8 to 15) in the time domain resources of the first resource, and the terminal device sends the third information on the symbols (the symbols 8 to 13) between the M symbols and the N symbols. Correspondingly, when detecting the scheduling request on the resource shown in FIG. 9(a), the network device determines that the first time length is a sum (the symbols 8 to 15, 8 symbols in total) of the quantity of the symbols occupied by the third information, and the quantity of the N symbols. It is worth mentioning that M and N are positive integers in this example, and N<the first time length. In addition, the terminal device sends at least one piece of third information on the time domain resources of the first resource. For example, in FIG. 9(a), the terminal device may send the third information merely on the symbols 8 to 11, and does not send any information on the symbols 12 and 13. In this case, the network device determines that the first time length is a sum of the quantity of the symbols occupied by the third information and the quantity of the N symbols. That is, the network device determines that the first time length is 6 (4+2) symbols.

In an embodiment, the sending, by the terminal device, the scheduling request on the first resource based on the time domain resources occupied by the second information and the time domain resources occupied by the third information includes: the time domain resources occupied by the second information include first M symbols in time domain resources of the first resource and N symbols after the time domain resources of the first resource, and the first time length is a sum of a quantity of symbols occupied by the third information and a quantity of the M symbols. The terminal device further sends the second information on the N symbols. Referring to FIG. 9(b), the first time length determined by the terminal device is 8 symbols. Therefore, when the terminal device sends the scheduling request, a time length of the time domain resources of the first resource used by the terminal device to carry the scheduling request is 8 symbols (the symbols 8 to 15, 8 symbols in total). Because M=2, and N=4, the terminal device sends the second information on the first 2 symbols (the symbols 8 and 9) in the time domain resources of the first resource and the 4 symbols (the symbols 16 to 19) after the time domain resources of the first resource, and the terminal device sends the third information on the symbols (the symbols 10 to 15) between the M symbols and the N symbols. Correspondingly, when detecting the scheduling request on the resource shown in FIG. 9(b), the network device determines that the first time length is a sum (the symbols 8 to 15, 8 symbols in total) of the quantity of the symbols occupied by the third information, and the quantity of the M symbols. It is worth mentioning that M and N are positive integers in this example, and M<the first time length. In addition, the terminal device sends at least one piece of third information on the time domain resources of the first resource. For example, in FIG. 9(b), the terminal device may send the third information merely on the symbols 14 and 15, and does not send any information on the symbols 10 to 13. In this case, the network device determines that the first time length is a sum of the quantity of the symbols occupied by the third information and the quantity of the M symbols. That is, the network device determines that the first time length is 4 (2+2) symbols.

In an embodiment of this application, the sending, by the terminal device, the scheduling request on the first resource further includes: sending, by the terminal device, the second information on a resource other than the first resource, where the second information is used to indicate the first time length. The network device detects, in the foregoing manner, the scheduling request sent by the terminal device. It can be understood that the terminal device sends at least one physical uplink channel on a third resource, and the physical uplink channel carries the scheduling request. The third resource includes the first resource and a resource occupied by the second information. A composition mode of the third resource is one of the following: a composition mode 1 of the third resource, including: one or more time domain resources occupied by the second information are included before the time domain resources of the first resource, and one or more time domain resources occupied by the second information are further included after the time domain resources of the first resource; a composition mode 2 of the third resource, including: one or more time domain resources occupied by the second information are included after the time domain resources of the first resource; and a composition mode 3 of the third resource, including: one or more time domain resources occupied by the second information are included before the time domain resources of the first resource.

Optionally, the scheduling request further includes the second information. It can be understood that the first resource includes one or more resources occupied by the second information. That is, one or more pieces of the second information may also be sent in the first resource. The one or more pieces of the second information are used as a part of the scheduling request.

Optionally, the scheduling request further includes third information, and the third information and the second information are used to indicate the first time length. It can be understood that the first resource includes one or more resources occupied by the third information. The third information is sent in the first resource, and is used as a part of the scheduling request.

Optionally, that the second information is used to indicate the first time length includes: that the resources occupied by the second information are used to indicate the first time length.

Optionally, that the second information and the third information are used to indicate the first time length includes: that the resources occupied by the second information and the resources occupied by the third information are used to indicate the first time length.

The physical uplink channel may be a physical uplink data channel, or a physical uplink control channel.

Optionally, the resources occupied by the second information are one or more time domain resources occupied by the second information, the resources occupied by the third information are one or more time domain resources occupied by the third information, and/or the first resource is the time domain resources of the first resource.

In the foregoing embodiments, the technical solutions provided in this application are mainly described from a perspective of method. It can be understood that, to implement the foregoing functions, the terminal device and the network device include corresponding hardware structures and/or software modules to execute all the functions. Persons of ordinary skill in the art should easily be aware that, with reference to the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

Figure 10:
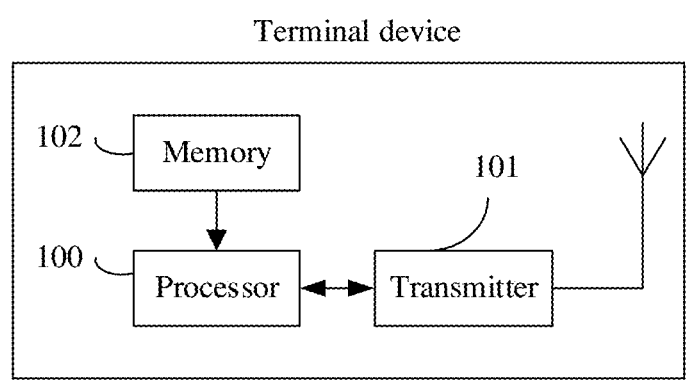
FIG. 10 is a possible schematic structural diagram of a terminal device according to this application.

FIG. 10 is a possible schematic structural diagram of the terminal device in the foregoing embodiments. In FIG. 10, a structure of the terminal device includes a processor 100 and a transmitter 101. The structure of the device may further include a memory 102, and the memory is configured to: be coupled to the processor and save necessary program instructions and data of the terminal device. The terminal device shown in FIG. 10 may perform the foregoing information sending method. To avoid repetition, detailed descriptions thereof are omitted herein.

Figure 11:
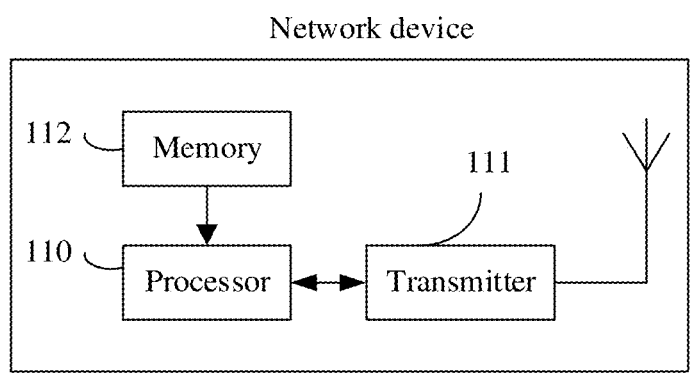
FIG. 11 is a possible schematic structural diagram of a network device according to this application.

FIG. 11 is a possible schematic structural diagram of the network device in the foregoing embodiments. In FIG. 11, a structure of the terminal device includes a processor 11o. The structure of the device may further include a transmitter 111. The structure of the device may further include a memory 112, and the memory is configured to: be coupled to the processor and save necessary program instructions and data of the network device. The network device shown in FIG. 11 may perform the foregoing information determining method. To avoid repetition, detailed descriptions thereof are omitted herein.

The devices in the terminal device shown in FIG. 10 and the network device shown in FIG. 11 are configured to perform the foregoing methods. Therefore, for beneficial effects of the network device and the terminal device, refer to beneficial effects of the foregoing methods, and details are not described herein again.

An embodiment of this application further provides a computer readable storage medium, including instructions. When executed on a terminal device, the instructions cause the terminal device to perform the foregoing information sending method.

An embodiment of this application further provides a computer readable storage medium, including instructions. When executed on a network device, the instructions cause the network device to perform the foregoing information determining method.

An embodiment of this application further provides a communications system. The communications system includes the terminal device shown in FIG. 10 and the network device shown in FIG. 11, and the terminal device and the network device communicate with each other to perform the foregoing information sending method and the foregoing information determining method.

It should be noted that the foregoing method embodiment of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logical device, a discrete gate or transistor logic device, or one or more of the discrete hardware components. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods with reference to hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Persons of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the embodiments of this application.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application.

The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application.

What is claimed is:

1. A method, comprising:
   determining, by a terminal device, a first time length corresponding to first information, wherein the first information comprises information about a data transmission resource;
   sending, by the terminal device, a scheduling request on a first resource, wherein a time length of the first resource is equal to the first time length, wherein the scheduling request requests the data transmission resource, wherein the scheduling request is sent independent of a periodic uplink control channel resource related to the terminal device, wherein the periodic uplink control channel resource is set by a network device; and wherein the sending, by the terminal device, the scheduling request on the first resource comprises sending, by the terminal device based on second information, the scheduling request on the first resource;
   wherein:
      time domain resources occupied by the second information comprise first M symbols in time domain resources of the first resource and last N symbols in the time domain resources of the first resource, and the first time length is a quantity of symbols from a first symbol of the M symbols to a last symbol of the N symbols; or
      the time domain resources occupied by the second information comprise first M symbols in time domain resources of the first resource and N symbols after the time domain resources of the first resource, the first time length is a sum of a quantity of symbols between a first symbol of the M symbols and a last symbol of the N symbols and a quantity of the M symbols, and the terminal device further sends the second information on the N symbols; or
      the time domain resources occupied by the second information comprise M symbols before time domain resources of the first resource and last N symbols in the time domain resources of the first resource, the first time length is a sum of a quantity of symbols between a first symbol of the M symbols and a last symbol of the N symbols and a quantity of the N symbols, and the terminal device further sends the second information on the M symbols; or
      the time domain resources occupied by the second information comprise M symbols before time domain resources of the first resource and N symbols after the time domain resources of the first resource, the first time length is a quantity of symbols between a first symbol of the M symbols and a last symbol of the N symbols, and the terminal device further sends the second information on the M symbols and the N symbols; and
   wherein M and N are both positive integers.

2. The method according to claim 1, wherein determining, by the terminal device, the first time length corresponding to first information comprises:
- determining, by the terminal device based on a first correspondence, the first time length corresponding to the first information, wherein the first correspondence comprises a correspondence between the first information and P time lengths, the P time lengths comprise the first time length, and P is an integer greater than or equal to 2; or
- determining, by the terminal device based on a second correspondence, the first time length corresponding to the first information, wherein the second correspondence comprises a correspondence between the first information and a first time length range, and the first time length range comprises the first time length; or
- determining, by the terminal device based on a third correspondence, the first time length corresponding to the first information, wherein the third correspondence comprises a correspondence between Q pieces of information and the first time length, the Q pieces of information comprise the first information, and Q is a positive integer.

3. The method according to claim 1, wherein the second information comprises a first sequence, a first pattern, or first scrambling code information.

4. The method according to claim 3, wherein sending, by the terminal device based on the second information, the scheduling request on the first resource comprises:
- sending, by the terminal device based on the time domain resources occupied by the second information, the scheduling request on the first resource.

5. The method according to claim 4, wherein:
- time domain resources of the first resource comprise time domain resources occupied by third information, the third information comprises a second sequence, a second pattern, second scrambling code information, or data, and the third information is different from the second information; and
- sending, by the terminal device based on the time domain resources occupied by the second information, the scheduling request on the first resource comprises:
  - sending, by the terminal device based on the time domain resources occupied by the second information and the time domain resources occupied by the third information, the scheduling request on the first resource.

6. The method according to claim 5, wherein:
- the time domain resources occupied by the second information comprise first M symbols in the time domain resources of the first resource and last N symbols in the time domain resources of the first resource, and the first time length is a sum of a quantity of symbols occupied by the third information, a quantity of the M symbols and a quantity of the N symbols; or
- the time domain resources occupied by the second information comprise first M symbols in the time domain resources of the first resource, and the first time length is a sum of a quantity of symbols occupied by the third information and a quantity of the M symbols; or
- the time domain resources occupied by the second information comprise last N symbols in the time domain resources of the first resource, and the first time length is a sum of a quantity of symbols occupied by the third information and a quantity of the N symbols; and
- wherein M and N are both positive integers.

7. The method according to claim 5, wherein:
- the time domain resources occupied by the second information comprise M symbols before the time domain resources of the first resource and N symbols after the time domain resources of the first resource, the first time length is a quantity of symbols occupied by the third information, and the terminal device further sends the second information on the M symbols and the N symbols; or
- the time domain resources occupied by the second information comprise M symbols before the time domain resources of the first resource, the first time length is a quantity of symbols occupied by the third information, and the terminal device further sends the second information on the M symbols; or
- the time domain resources occupied by the second information comprise N symbols after the time domain resources of the first resource, the first time length is a quantity of symbols occupied by the third information, and the terminal device further sends the second information on the N symbols; and
- wherein M and N are both positive integers.

8. The method according to claim 5, wherein:
- the time domain resources occupied by the second information comprise M symbols before the time domain resources of the first resource and last N symbols in the time domain resources of the first resource, the first time length is a sum of a quantity of symbols occupied by the third information and a quantity of the N symbols, and the terminal device further sends the second information on the M symbols; or
- the time domain resources occupied by the second information comprise first M symbols in the time domain resources of the first resource and N symbols after the time domain resources of the first resource, the first time length is a sum of a quantity of symbols occupied by the third information and a quantity of the M symbols, and the terminal device further sends the second information on the N symbols; and
- wherein M and N are both positive integers.

9. The method according to claim 5, wherein:
- the terminal device sends the second information based on a first power threshold; or
- the terminal device sends the third information based on a second power threshold.

10. A terminal device, comprising:
- a transmitter;
- a processor;
- a non-transitory computer-readable storage medium storing a program to be executed by the processor, the program including instructions for:
  - determining a first time length corresponding to first information, wherein the first information comprises information about a data transmission resource; and
  - sending, using the transmitter, a scheduling request on a first resource, wherein a time length of the first resource is equal to the first time length, wherein the scheduling request requests the data transmission resource, wherein the scheduling request is sent independent of a periodic uplink control channel resource related to the terminal device, wherein the periodic uplink control channel resource is set by a network device, and wherein the sending, by the terminal device, the scheduling request on the first resource comprises sending, by the terminal device based on second information, the scheduling request on the first resource;

wherein:
  time domain resources occupied by the second information comprise first M symbols in time domain resources of the first resource and last N symbols in the time domain resources of the first resource, and the first time length is a quantity of symbols from a first symbol of the M symbols to a last symbol of the N symbols; or
  the time domain resources occupied by the second information comprise first M symbols in time domain resources of the first resource and N symbols after the time domain resources of the first resource, the first time length is a sum of a quantity of symbols between a first symbol of the M symbols and a last symbol of the N symbols and a quantity of the M symbols, and the terminal device further sends the second information on the N symbols; or
  the time domain resources occupied by the second information comprise M symbols before time domain resources of the first resource and last N symbols in the time domain resources of the first resource, the first time length is a sum of a quantity of symbols between a first symbol of the M symbols and a last symbol of the N symbols and a quantity of the N symbols, and the terminal device further sends the second information on the M symbols; or
  the time domain resources occupied by the second information comprise M symbols before time domain resources of the first resource and N symbols after the time domain resources of the first resource, the first time length is a quantity of symbols between a first symbol of the M symbols and a last symbol of the N symbols, and the terminal device further sends the second information on the M symbols and the N symbols; and
  wherein M and N are both positive integers.

11. The terminal device according to claim 10, wherein the instructions for determining the first time length corresponding to the first information comprise instructions for:
  determining, based on a first correspondence, the first time length corresponding to the first information, wherein the first correspondence is between the first information and P time lengths, the P time lengths comprise the first time length, and P is an integer greater than or equal to 2; or
  determining, based on a second correspondence, the first time length corresponding to the first information, wherein the second correspondence is between the first information and a first time length range, and the first time length range comprises the first time length; or
  determining, based on a third correspondence, the first time length corresponding to the first information, wherein the third correspondence comprises a correspondence between Q pieces of information and the first time length, the Q pieces of information comprise the first information, and Q is a positive integer.

12. The terminal device according to claim 10, wherein the second information comprises a first sequence, a first pattern, or first scrambling code information.

13. The terminal device according to claim 12, wherein the instructions for sending the scheduling request on the first resource based on the second information comprise instructions for:
  sending the scheduling request on the first resource based on the time domain resources occupied by the second information.

14. The terminal device according to claim 13, wherein:
  time domain resources of the first resource comprise time domain resources occupied by third information, wherein the third information comprises a second sequence, a second pattern, second scrambling code, or data, and the third information is different from the second information; and
  the program includes instructions for:
    sending the scheduling request on the first resource based on the time domain resources occupied by the second information and the time domain resources occupied by the third information.

15. The terminal device according to claim 14, wherein:
  the time domain resources occupied by the second information comprise first M symbols in the time domain resources of the first resource and last N symbols in the time domain resources of the first resource, and the first time length is a sum of a quantity of symbols occupied by the third information, a quantity of the M symbols and a quantity of the N symbols; or
  the time domain resources occupied by the second information comprise first M symbols in the time domain resources of the first resource, and the first time length is a sum of a quantity of symbols occupied by the third information and a quantity of the M symbols; or
  the time domain resources occupied by the second information comprise last N symbols in the time domain resources of the first resource, and the first time length is a sum of a quantity of symbols occupied by the third information and a quantity of the N symbols; and
  wherein M and N are both positive integers.

16. The terminal device according to claim 14, wherein:
  the time domain resources occupied by the second information comprise M symbols before the time domain resources of the first resource and N symbols after the time domain resources of the first resource, the first time length is a quantity of symbols occupied by the third information, and the program further includes instructions for sending, using the transmitter, the second information on the M symbols and the N symbols; or
  the time domain resources occupied by the second information comprise M symbols before the time domain resources of the first resource, the first time length is a quantity of symbols occupied by the third information, and the program further includes instructions for sending, using the transmitter, the second information on the M symbols; or
  the time domain resources occupied by the second information comprise N symbols after the time domain resources of the first resource, the first time length is a quantity of symbols occupied by the third information, and the program further includes instructions for sending, using the transmitter, the second information on the N symbols; and
  wherein M and N are both positive integers.

17. A network device, comprising:
  a processor;
  a non-transitory computer-readable storage medium storing a program to be executed by the processor, the program including instructions for:
    determining a first time length of a first resource, wherein the first resource is used to carry a scheduling request that is received by the network device from a terminal device, wherein the scheduling request requests a data transmission resource, and wherein the scheduling request is received independent of a periodic uplink control channel resource related to the terminal device that is set by the network device; and determining first information corresponding to the first time length, wherein the first information comprises information about the data transmission resource, and wherein the instructions for determining the first information corresponding to the first time length further comprise instructions for:

determining, based on a first correspondence, the first information corresponding to the first time length, wherein the first correspondence is between P time lengths and the first information, the P time lengths comprise the first time length, and P is an integer greater than or equal to 2; or determining, based on a second correspondence, the first information corresponding to the first time length, wherein the second correspondence is between a first time length range and the first information, and the first time length range comprises the first time length; or determining, based on a third correspondence, the first information corresponding to the first time length, wherein the third correspondence is between the first time length and Q pieces of information, the Q pieces of information comprise the first information, and Q is a positive integer.

* * * * *